Nov. 14, 1967   A. G. BODINE, JR   3,352,369
SONIC METHOD AND APPARATUS FOR DRIVING
ANCHORS, ANCHOR POSTS AND THE LIKE
Filed March 19, 1965   11 Sheets-Sheet 1

INVENTOR.
ALBERT G. BODINE, JR.
BY
ATTORNEY

INVENTOR.
ALBERT G. BODINE, JR
BY
ATTORNEY

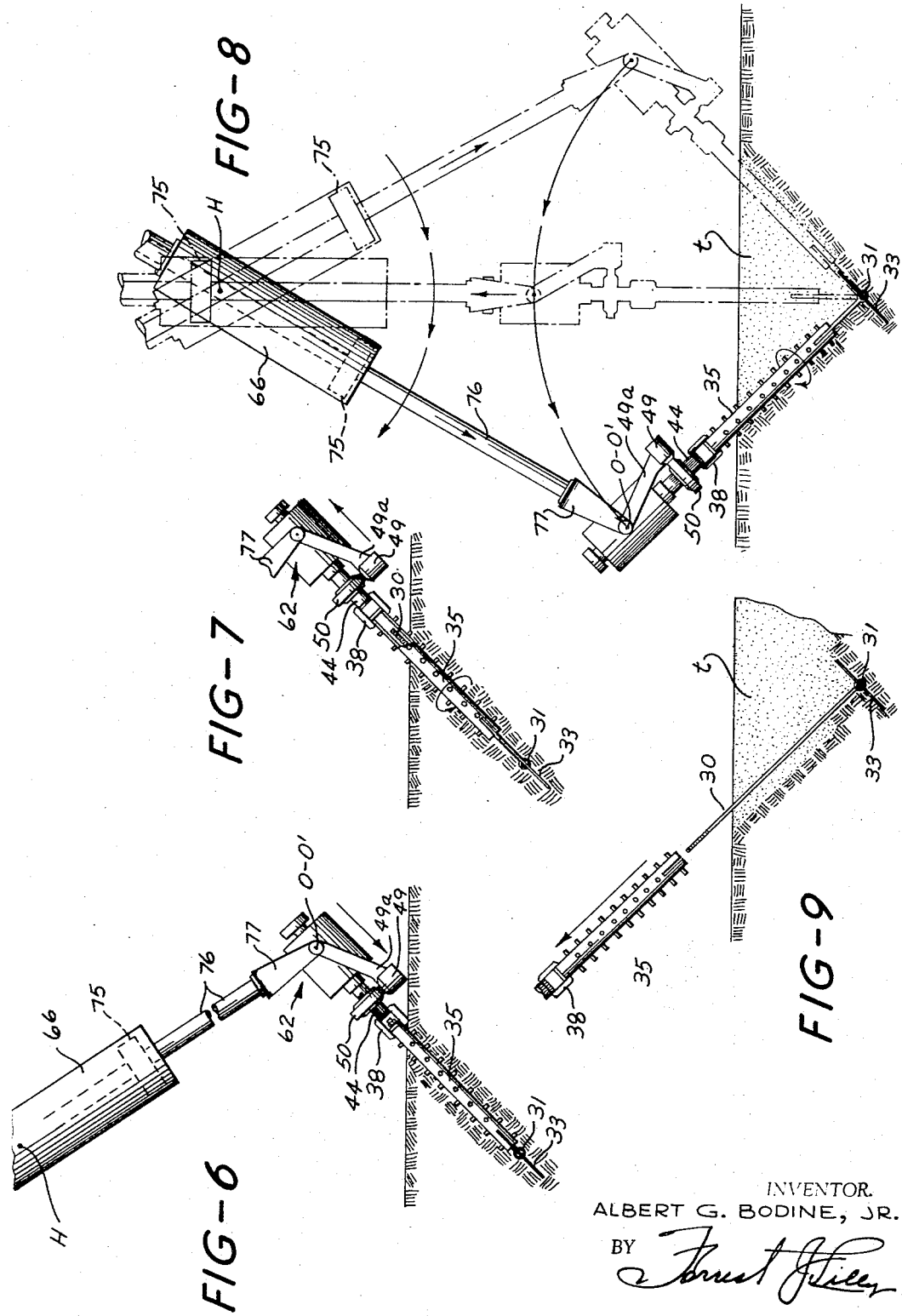

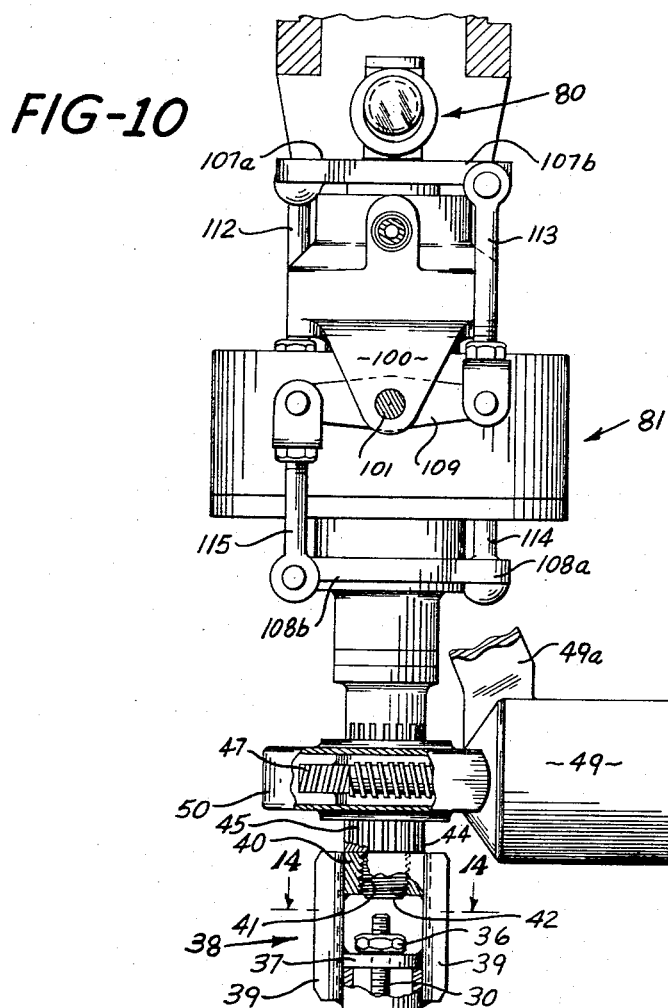
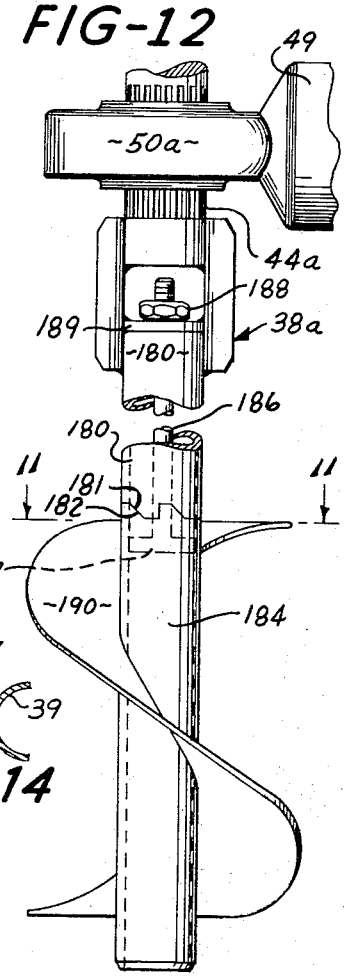
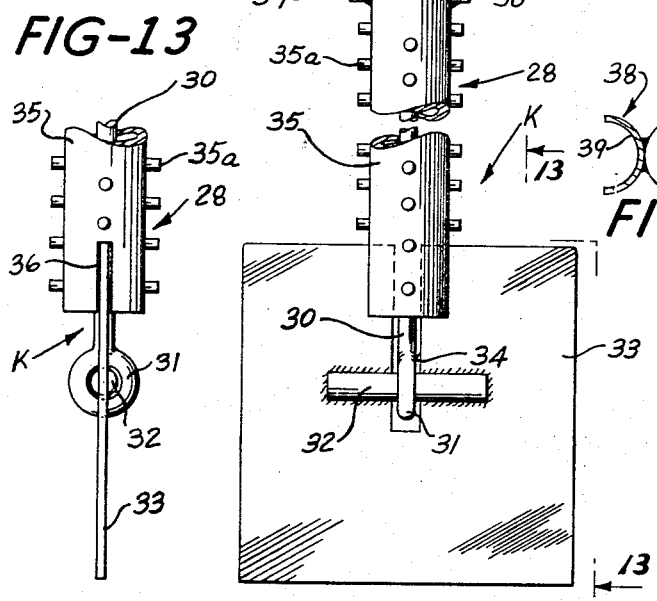

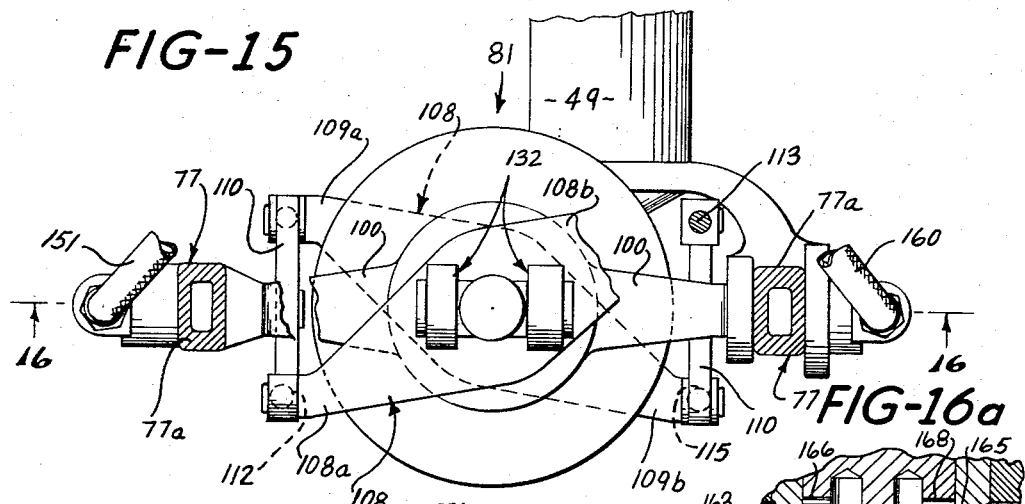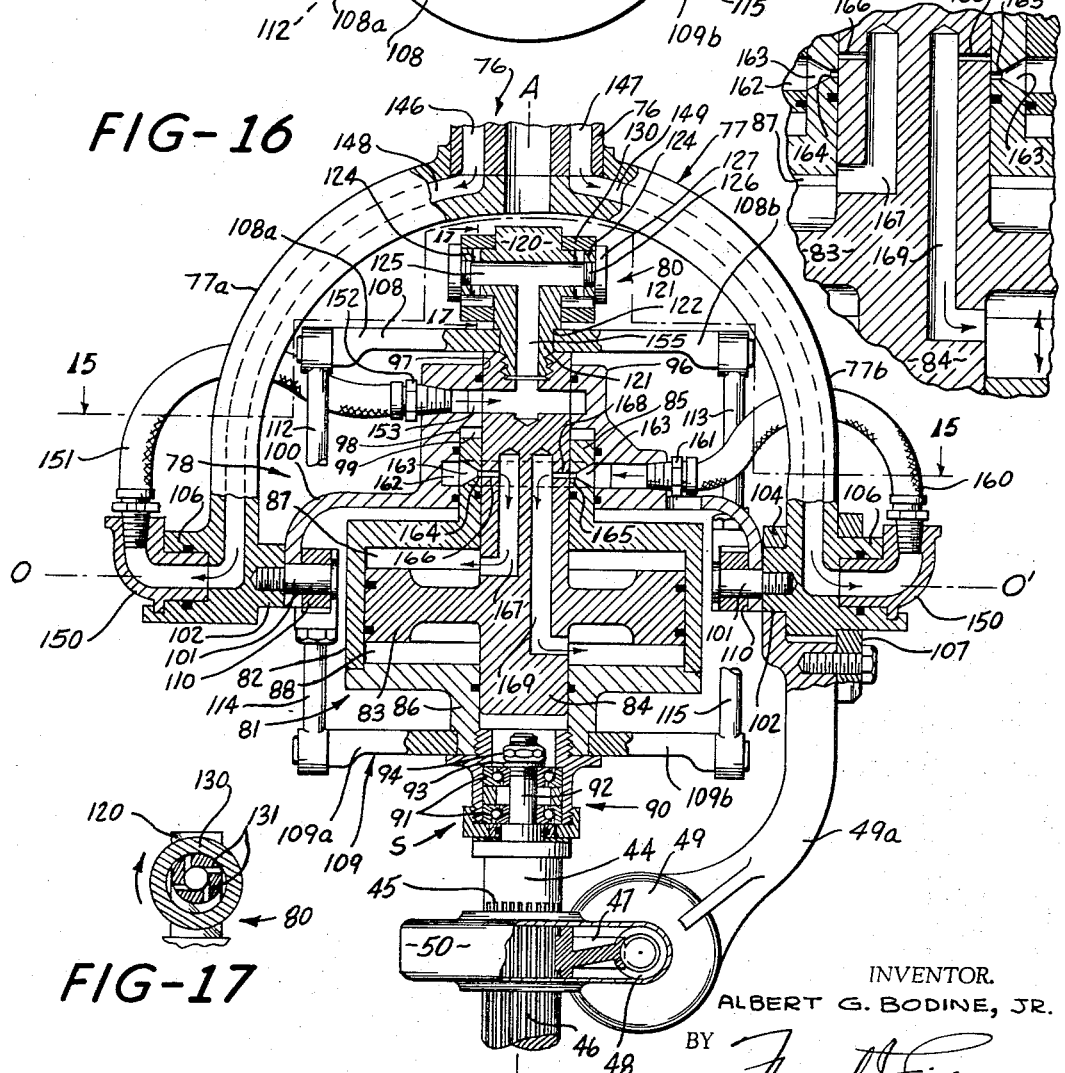

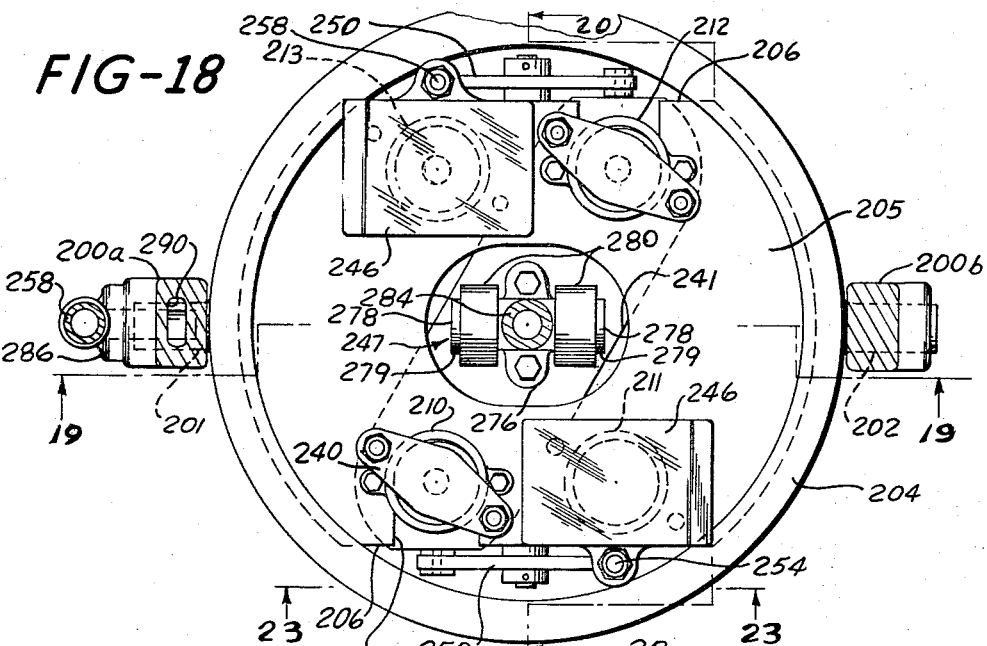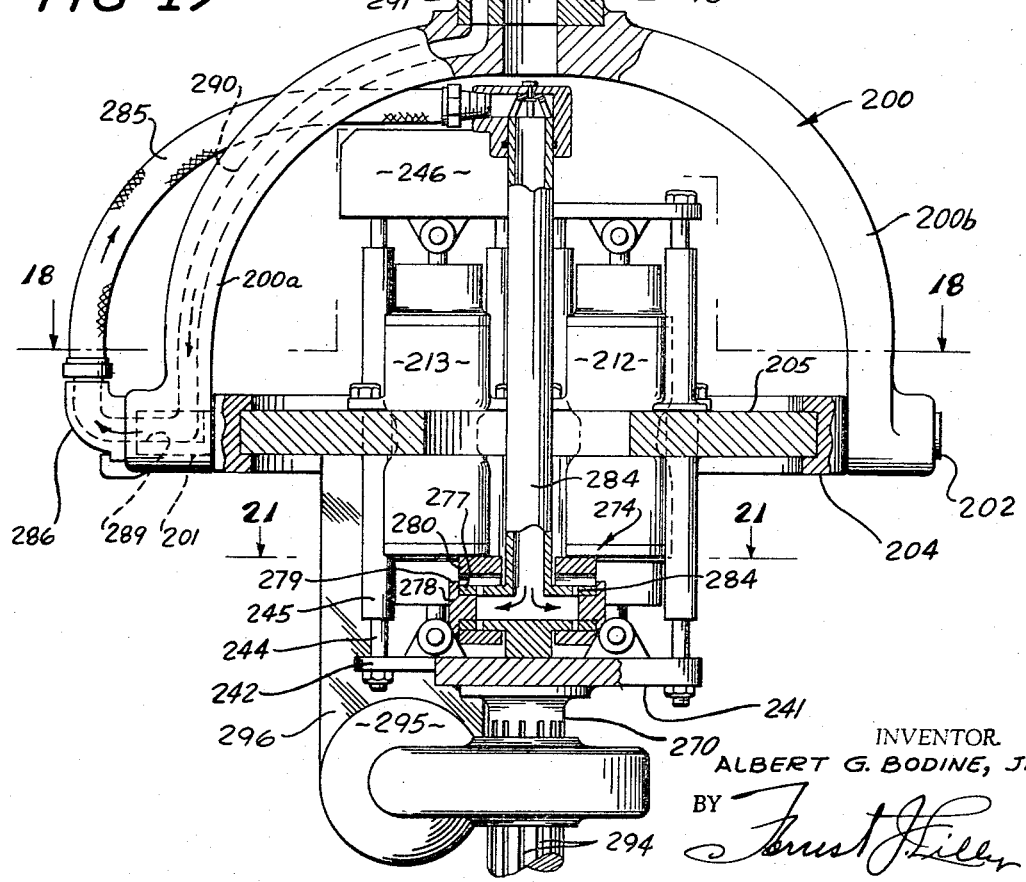

Nov. 14, 1967  A. G. BODINE, JR  3,352,369
SONIC METHOD AND APPARATUS FOR DRIVING
ANCHORS, ANCHOR POSTS AND THE LIKE
Filed March 19, 1965  11 Sheets-Sheet 7

INVENTOR.
ALBERT G. BODINE, JR.
BY
ATTORNEY

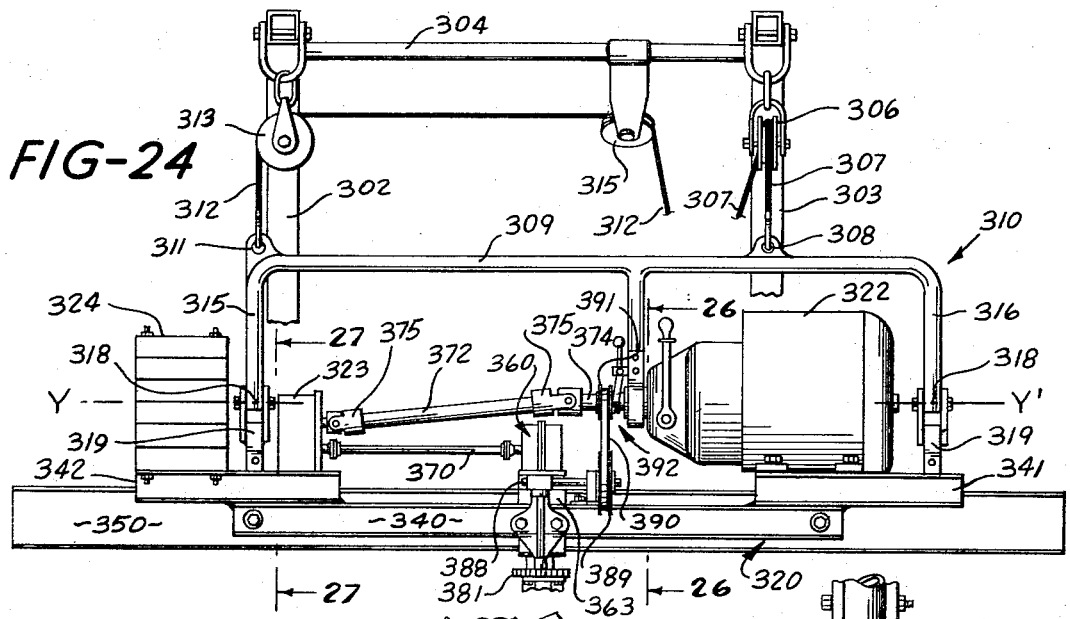
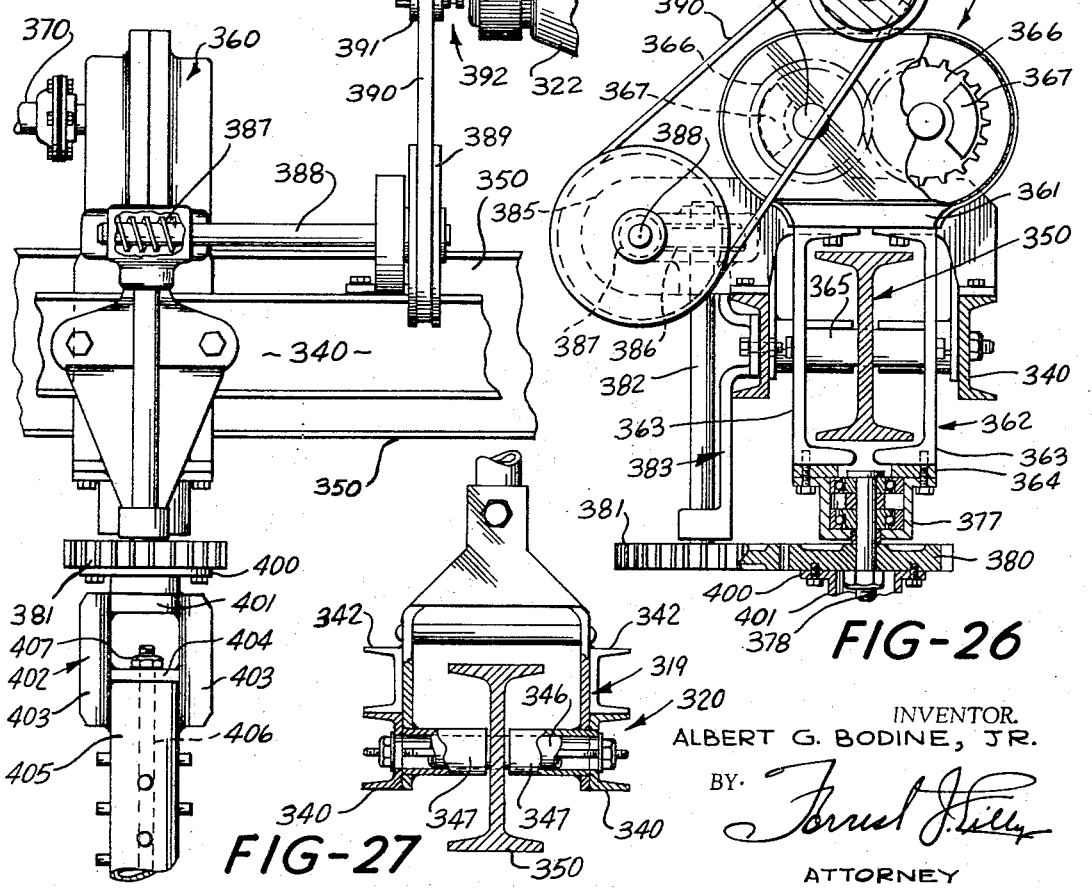

Nov. 14, 1967  A. G. BODINE, JR  3,352,369
SONIC METHOD AND APPARATUS FOR DRIVING
ANCHORS, ANCHOR POSTS AND THE LIKE
Filed March 19, 1965  11 Sheets-Sheet 10
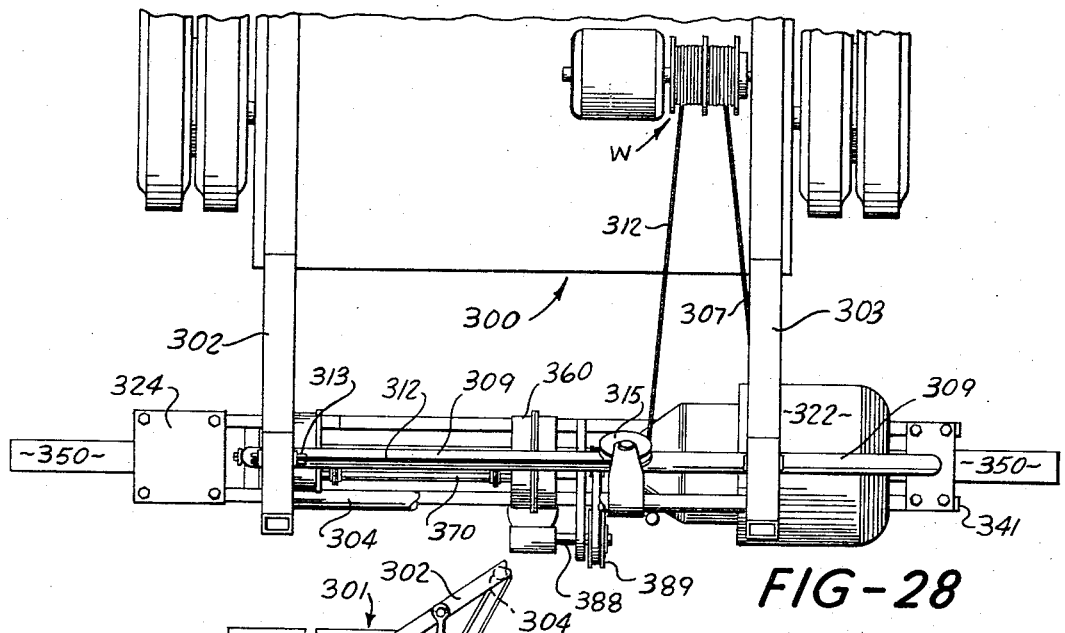
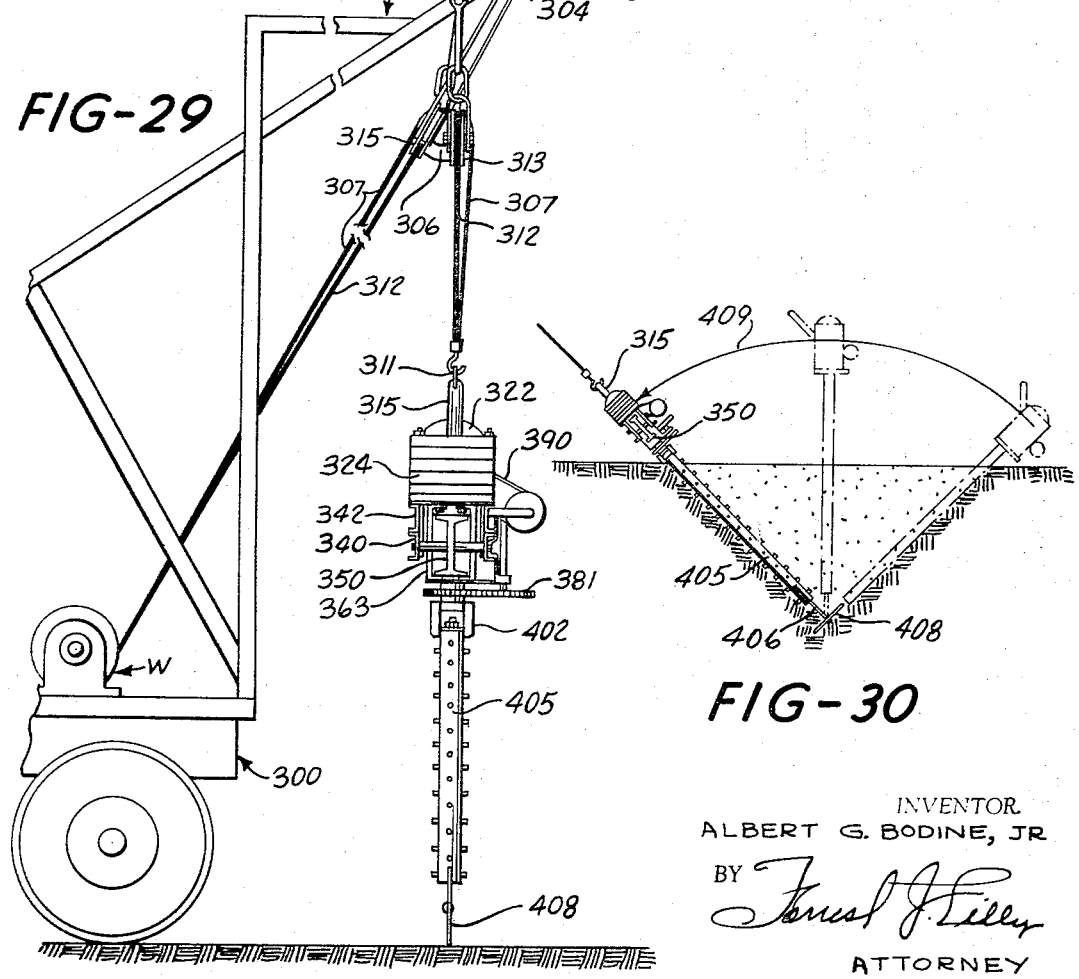
INVENTOR.
ALBERT G. BODINE, JR
BY
ATTORNEY Nov. 14, 1967  A. G. BODINE, JR  3,352,369
SONIC METHOD AND APPARATUS FOR DRIVING
ANCHORS, ANCHOR POSTS AND THE LIKE
Filed March 19, 1965  11 Sheets-Sheet 11

INVENTOR.
ALBERT G. BODINE, JR.
BY
ATTORNEY

3,352,369
Patented Nov. 14, 1967

3,352,369
SONIC METHOD AND APPARATUS FOR DRIVING ANCHORS, ANCHOR POSTS AND THE LIKE
Albert G. Bodine, Jr., Los Angeles, Calif.
(7877 Woodley Ave., Van Nuys, Calif. 91406)
Filed Mar. 19, 1965, Ser. No. 441,209
15 Claims. (Cl. 175—56)

ABSTRACT OF THE DISCLOSURE

A device for driving a stem or post into the earth comprised of an elastically vibratory element coupled to the stem and two mass elements both coupled to the elastically vibratory element and which mass elements move in opposite phase relative to one another. One of the mass elements includes the stem. A sonic oscillator is coupled to a moving part of the system so as to generate a resonant frequency for the system.

---

This invention relates to methods and apparatus for driving earth anchors, anchor posts, post and anchor combinations, fence posts, stakes, pipe, and the like into the ground, and a general object of the invention is the provision of a novel system for so doing relying upon a resonant vibratory apparatus combined in a driving relationship with the post, post and anchor, or similar member or combination.

The present application has relation to, and utilizes principles of, certain pile driving processes and apparatus using sonic vibrations, as disclosed and claimed in my prior patents and applications as follows: Patent No. 2,975,846; Patent No. 3,054,463; application Ser. No. 186,608, filed Mar. 29, 1962, which is a division of Patent No. 3,054,463; and application Ser. No. 165,126, filed Jan. 9, 1962, now Patent No. 3,189,106. As taught in said patents and applications, a pile can be driven into the ground by setting up therein sonic, longitudinally directed, resonant standing wave vibrations, typically of half-wavelength, so that antinodes are produced at the two ends, and a node at the midpoint, and at the same time urging the pile in a downward direction by application of a downward bias force. The pile undergoing this standing wave vibration cyclically elastically elongates and contracts, the mid-point of the pile vibrating at minimized amplitude, and the two half-length portions on opposite sides of the mid-point or node alternately elastically elongating and contracting, with the elastic elongation and contraction per unit of length progressively increasing from the mid-point of each end. A sonic vibrator or vibration generator, for creating an alternating force output at a predetermined resonant frequency, is coupled to the top end of the pile, and adds a certain "lumped" mass thereto. The pile has distributed constants of mass and elasticity, and exhibits mass reactance as well as elastic compliance reactance. These terms of reactance, and others used herein, are understood in the sonics art, but will for convenience be fully explained and defined in the latter part of this introduction to the specification. The system of vibration generator and pile is resonant when the total mass reactance of these coupled members is equal to the elastic compliance reactance of the system at the operating frequency of the generator. The pile when engaged with the ground presents a high impedance to the vibration generator, impedance being understood to be the quotient of cyclic force applicable to cyclic velocity amplitude when the pile is in vibration. The vibration generator should be designed to deliver its alternating or cyclic output force also at high impedance, of the same order of magnitude as that of the pile engaged with the ground. Also, the pile as vibrated by the vibration generator has an output impedance which is of the order of the impedance of the earth material into which it is engaged. Under these conditions, the lower end of the pile acts to fluidize the soil, and the soil moves or flows to accommodate downward penetration of the pile into the ground. Similar basic principles, but with important modifications, are employed in the present invention, where the posts or other members are too short to permit use of standing waves because of the inordinately high frequencies that would be required at the short post lengths.

First, therefore, according to the invention, no effort is made to set up a vibratory resonant standing wave in the post or other member to be driven, as is done in the pile in the sonic pile driver inventions. Instead, the post assumes the status of a mere "lump" or "lumped mass," and is incorporated as such in a resonant elastically vibratory system. The post, or combination of post and anchor, thus comprises a mass which vibrates in a resonant environment. This resonant environment is completed by the provision of some separate compliant elastically vibratory member or element in this environment, as well as additional vibratory mass. The resonant system thus comprises the post, with or without a separate anchor means, the separate compliant elastically vibratory member, and the additional vibratory mass, the latter comprised at least in part of the vibration generator. It will be seen that the post being driven into the ground is not the same member as the elastically vibratory member mentioned. The post can then be relatively short without having to go to relatively high frequency vibration. The elastically vibratory member can be embodied or configured in various ways to keep its dimensions within desirable limits while still holding the vibration frequency fairly low, as, for example, of the preferred order of from 60 to 120 cycles per second. A relatively compact elastically vibratory system, wholly or partially of "lumped" constant type, is thus afforded.

One simple illustrative form of the invention involves the use of a horizontally disposed elastically vibratory bar, vibratory laterally, by a transverse elastic bending, arranged crosswise on the top of a post, forming a device something like the letter T. This T-bar configuration permits lateral elastic vibratory action, in a lateral standing wave pattern, in the cross-member to which the vertical anchor post is coupled. The elastic wave action in the center region of the cross-bar is in an up and down direction, and results in moving the post vertically up and down correspondingly, vibrating more or less bodily or as an inertia mass unit. This system has the similarity to the aforementioned pile driver inventions that a vibrating member to be driven, vibrating in the essential resonant system, therefore has an output impedance of the order of that of the earth material into which it is driven. To this end, of course, in general correspondence to the case of the sonic pile drivers, the vibration generator has the proper output impedance for effective drive of the resonant vibratory system, and the output impedance of the post forming a part of this vibratory system is then comparable with the impedance of the earth into which it is driven. It is of course important to recognize, in this general connection, that each local region in an elastically vibratory member or system experiences the impedance characteristic of its local environment, and that this is true whether a particular local region vibrates elastically, or bodily, provided it is part of a system which has elastic resonance. Directing attention now to the elastically vibratory function only, and to the presently considered illustrative embodiment comprised of a T-fixture made up of a laterally elastically vibratory bar in a horizontal disposition, with a vertical post extending downwardly from the center thereof, a localized elastically vibratory action occurs in the center region of the horizontal bar. The configuration under consideration comprises acoustically speaking a resonant circuit which is sensitively conscious of and responsive to the acoustic impedance presented at the center region of the horizontal bar. To further analyze the T-fixture the resonant circuit comprises the elastically vibratory horizontal bar, which of course has mass distributed along it, as well as elasticity, or elastic compliance, together with the mass element comprised of the vertically disposed post which is engaged with and to be driven into the ground. The T-fixture described comprises a vibratory system of fairly high Q when suspended in the air and vibrated prior to being driven into the ground. The factor Q will be understood, of course, to be a figure of merit of elastically vibratory systems denoting the ratio of mass reactance, for example, to the frictional resistance to vibration experienced by the system. It also represents what can be aptly described as the "flywheel" effect of the vibratory system. Now, as soon as the post member is brought into engagement with the ground, the whole acoustic circuit becomes conscious of the new impedance environment, and the system automatically makes proper acoustic adaptation thereto. One obvious occurrence is that the vibration amplitude is greatly reduced at a given input horsepower. It is of interest to note in this regard that the frequency of vibration is not materially affected, demonstrating that the resonance frequency of the system depends upon components of the acoustic circuit comprised of the T-fixture, and not upon a bouncing type of resonance effect common in some older systems where a pile or the like is bodily vibrated against the ground which, in this case, acts as the spring member of the system.

In addition, it is important to recognize that the employment of the separate and discrete resonant system of the type here described, in common with my sonic pile driver inventions, results in an over-all system wherein the earth presents practically only a resistive impedance. This desirable condition very greatly reduces the transmission of vibration through the ground. Prior art systems characterized by a pile vibrated bodily at a frequency to "bounce" on the ground, with a bouncing type of resonance action, result always in transmission of vibration through the ground at substantial amplitudes, with resulting troubles with adjacent structures. The post driving system of the present invention, in common with the sonic pile driver, having its own discrete elastically vibratory system, separate of the earth's structure into which the post is being driven, does not result in substantial energy dissipation for long distances out into the ground. The result is a very effective and efficient application of sonic energy for the post penetration effect desired.

The resonant, elastically vibratory post driving system of the invention operates with a soil fluidization effect akin to that characteristic of the sonic pile driver performance, and the post is worked rapidly down into the soil. One principal advantage of this form of the invention is that the elastically vibratory system used to drive the anchor post can be confined within sufficiently reasonable over-all dimensions such as to permit easy portability, as is required for such commercial operations as the driving of fence posts, power line anchors, etc.

In a preferred embodiment of the invention, the sonic vibration generator is coupled to the elastically vibratory means very close to the point where the post itself is also coupled. In such a configuration the elastically vibratory member thus does not have to transmit energy along its wave pattern from the generator to the post being driven. Thus, the loss factor along the wave pattern is low. An additional advantage in such a preferred embodiment is that the acoustic nodes of the wave pattern in the elastically vibratory member are very pronounced, because there is very low energy flow in the wave, affording the opportunity to mount the elastically vibratory member at these nodes and thus gain good isolation of the vibratory system from the framework of the apparatus.

The particular T-fixture configuration mentioned hereinabove as one illustrative embodiment of the invention is advantageous for discussion of the basic principles involved in the invention, but in other illustrative embodiments of the invention, the horizontally disposed laterally elastically vibratory beam, or cross-member of the T, is replaced by fluid springs, pneumatic or hydraulic. Another form substitutes a flexing elastic plate for the beam. These forms result in desirably compact over-all dimensions for the apparatus.

Analyzing the invention theoretically from the standpoint of the elements entering into its basic combination, there is, first, an elongated stem, which may be a post, anchor rod or pipe or the like, which is to be driven into the ground. There is, second, an elastically vibratory element coupled to this stem. Included in the combination are two mass elements which are both coupled to the elastically vibratory element, and which move in opposite phase relative to one another. One of these mass elements includes the stem, together, usually, with some additional mass. The other mass element counterbalances the stem region of the assembly. The two oppositely moving mass elements are acoustically coupled in the system, and move cyclically relatively to one another; and they both may be integrated into different portions of the same total physical structure comprising the resonant system. The final essential element is the sonic oscillator or vibration generator coupled to some moving part of the system whereby it can deliver sonic vibratory energy thereto. An especially desirable location for the sonic vibration generator is adjacent the stem or post itself, so that the elastic element is not required to transmit sonic energy from the generator to the stem. It merely transmits cyclic force to the above described counterbalancing mass or mass regions.

With the foregoing theoretical background discussion out of the way, further objects and features may be considered.

It is an object of the invention to provide posts and anchors and anchor driving systems such that the posts and anchors may be driven directly into the earth without the necessity of first digging a hole to put them in, and by which they may be positioned without disturbing the holding soil, so that their holding power is greatly increased.

A further object is to provide a machine which will vibrate the post, or post and anchor combination, while it is being directed into the soil and which will guide it in the proper direction, while a further object is to provide such a machine which is portable and adaptable to all types of terrain and which will install anchors many times faster than by methods heretofore known or available.

According to one form of the invention, the anchor is driven into the earth at about forty-five degrees with the vertical. Then a trench is dug normal to the anchor, and a rod or post pivotally attached to the anchor is moved over in the trench to about ninety degrees with respect to the anchor, so that the pull on the rod after installation is substantially normal to the plane of installation. This pulling stress on the rod and anchor are thus substantially normal to the plane of installation, and the stress on the earth material which is then holding the anchor is exerted on material which was substantially undisturbed in the course of installation of the anchor.

A further form of the invention involves the use of a spiral-type anchor, in which the direction of vibration is coaxial with the drive rod or post, but the anchor rotates about the axis as it advances into the soil. The anchor is either allowed to rotate itself in the manner of a drive screw from its reaction with the soil or it may be actually mechanically rotated about the axis of drive while being vibrated.

Certain acoustic phenomena disclosed in the foregoing and hereinafter, are, generally speaking, outside the experience of those skilled in the acoustics art. To aid in a full understanding of these phenomena by those skilled in the acoustics art, and by others, the following general discussion, including definition of terms, is deemed to be of importance.

By the expression "sonic vibration" I mean elastic vibrations, i.e., cyclic elastic deformations, which travel through a medium with a characteristic velocity of propagation. If these vibrations travel longitudinally, or create a longitudinal wave pattern in a medium or structure having uniformly distributed constants of elasticity or modulus and mass, this is sound wave transmission. Regardless of the vibratory frequency of such sound wave transmission, the same mathematical formulae apply, and the science is called sonics. In addition, there can be elastically vibratory systems wherein the essential features of mass appear as a localized influence or parameter, known as a "lumped constant"; and another such lumped constant can be a localized or concentrated elastically deformable element, affording a local effect referred to variously as elasticity, modulus, modulus of elasticity, stiffness, stiffness modulus, or compliance, which is the reciprocal of the stiffness modulus. Fortunately, these constants, when functioning in an elastically vibratory system such as mine, have cooperating and mutually influencing effects like equivalent factors in alternating-current electrical systems. In fact, in both distributed and lumped constant systems, mass is mathematically equivalent to inductance (a coil); elastic compliance is mathematically equivalent to capacitance (a condenser); and friction or other pure energy dissipation is mathematically equivalent to resistance (a resistor).

Because of these equivalents, my elastic vibratory systems with their mass and stiffness and energy consumption, and their sonic energy transmission properties, can be viewed as equivalent electrical circuits, where the functions can be expressed, considered, changed and quantitatively analyzed by using well proven electrical formulae.

It is important to recognize that the transmission of sonic energy into the interface or work area between two parts to be moved against one another requires the above mentioned elastic vibration phenomena in order to accomplish the benefits of my invention. There have been other proposals involving exclusively simple bodily vibration of some part. However, these latter do not result in the benefits of my sonic or elastically vibratory action.

Since sonic or elastic vibration results in the mass and elastic compliance elements of the system taking on these special properties akin to the parameters of inductance and capacitance in alternating current phenomena, wholly new performances can be made to take place in the mechanical arts. The concept of acoustic impedance becomes of paramount importance in understanding performances. Here impedance is the ratio of cyclic force or pressure acting in the media to resulting cyclic velocity or motion, just like the ratio of voltage to current. In this sonic adaptation impedance is also equal to media density times the speed of propagation of the elastic vibration.

In this invention impedance is important to the accomplishment of desired ends, such as where there is an interface. A sonic vibration transmitted across an interface between two media or two structures can experience some reflection, depending upon differences of impedance. This can cause large relative motion, if desired, at the interface.

Impedance is also important to consider if optimized energization of a system is desired. If the impedances are adjusted to be matched somewhat, energy transmission is made very effective.

Sonic energy at fairly high frequency can have energy effects on molecular or crystalline systems. Also, these fairly high frequencies can result in very high periodic acceleration values, typically of the order of hundreds or thousands of times the acceleration of gravity. This is because mathematically acceleration varies with the square of frequency. Accordingly, by taking advantage of this square function, I can accomplish very high forces with my sonic systems. My sonic systems preferably accomplish such high forces, and high total energy, by using a type of sonic vibration generator taught in my Patent No. 2,960,314, which is a simple mechanical device. The use of this type of sonic vibration generator in the sonic system of the present invention affords an especially simple, reliable, and commercially feasible system.

An additional important feature of these sonic circuits is the fact that they can be made very active, so as to handle substantial power, by providing a high Q factor. Here this factor Q is the ratio of energy stored to energy dissipated per cycle. In other words, with a high Q factor, the sonic system can store a high level of sonic energy, to which a constant input and output of energy is respectively added and subtracted. Circuit-wise, this Q factor is numerically the ratio of inductive reactance to resistance. Moreover, a high Q system is dynamically active, giving considerable cyclic motion where such motion is needed.

Certain definitions should now be given:

Impedance, in an elastically vibratory system, is, mathematically, the complex quotient of applied alternating force and linear velocity. It is analogous to electrical impedance. The concise mathematical expression for this impedance is $$Z = R + \sqrt{-1}\left(2\pi f M - \frac{1}{2\pi f C}\right)$$

where M is vibratory mass, C is elastic compliance (the reciprocal of stiffness, or of modulus of elasticity) and $f$ is the vibration frequency.

Resistance is the "real" part R of the impedance, and represents energy dissipation, as by friction.

Reactance is the "imaginary" part of the impedance, and is the difference of mass reactance and compliance reactance.

Mass reactance is the positive imaginary part of the impedance, given by $2\pi f M$. It is analogous to electrical inductive reactance, just as mass is analogous to inductance.

Elastic compliance reactance is the negative imaginary part of impedance, given by $1/2\pi f C$. Elastic compliance reactance is analogous to electrical capacitative reactance, just as compliance is analogous to capacitance.

Resonance in the vibratory circuit is obtained at the operating frequency at which the reactance (the algebraic sum of mass and compliance reactances) becomes zero. Vibration amplitude is limited under this condition to resistance alone, and is maximized. The inertia of the mass elements necessary to be vibrated does not under this condition consume any of the driving force.

A valuable feature of my sonic circuit is the provision of enough extra elastic compliance reactance so that the mass or inertia of various necessary bodies in the system does not cause the system to depart so far from resonance that a large proportion of the driving force is consumed and wasted in vibrating this mass. For example, a mechanical oscillator or vibration generator of the type normally used in my inventions always has a body, or carrying structure, for containing the cyclic force generating means. This supporting structure, even when minimal, still has mass, or inertia. This inertia could be a force-wasting detriment, acting as a blocking impedance using up part of the periodic force output just to accelerate and decelerate this supporting structure. However, by use of elastically vibratory structure in the system, the effect of this mass, or the mass reactance resulting therefrom, is counteracted at the frequency for resonance; and when a resonant acoustic circuit is thus used, with adequate capacitance (elastic compliance reactance), these blocking impedances are tuned out of existence, at resonance, and the periodic force generating means can thus deliver its full impulse to the "work," which is the resistive component of the impedance.

Sometimes it is especially beneficial to couple the sonic oscillator at a low-impedance (high-velocity vibration) region, for optimum power input, and then have high impedance (high-force vibration) at the work point. The sonic circuit is then functioning additionally as a transformer, or acoustic lever, to optimize the effectiveness of both the oscillator region and the work delivering region.

For very high-impedance systems having high Q at high frequency, I sometimes prefer that the resonant elastic system be a bar of solid material such as steel. For lower frequency or lower impedance, especially where large amplitude vibration is desired, I use a fluid resonator. One desirable species of my invention employs, as the source of sonic power, a sonic resonant system comprising an elastic member in combination with an orbiting mass oscillator or vibration generator, as above mentioned. This combination has many unique and desirable features. For example, this orbiting mass oscillator has the ability to adjust its input power and phase to the resonant system so as to accommodate changes in the work load, including changes in either or both the reactive impedance and the resistive impedance. This is a very desirable feature in that the oscillator "hangs on" to the load even as the load changes.

It is important to note that this unique advantage of the orbiting mass oscillator accrues from the combination thereof with the acoustic resonant circuit, so as to comprise a complete acoustic system. In other words, the orbiting mass oscillator is matched up to the resonant part of its system, and the combined system is matched up to the acoustic load, or the job to be accomplished. One manifestation of this proper matching is a characteristic whereby the orbiting mass oscillator tends to "lock in" to the resonant frequency of the resonant part of the system.

The combined system has a unique performance which is exhibited in the form of a greater effectiveness and particularly greater persistence in a sustained sonic action as the work process proceeds or goes through phases and changes of conditions. The orbiting mass oscillator, in this matched-up arrangement, is able to hang on to the load and continue to develop power as the sonic energy absorbing environment changes with the variations in sonic energy absorption by the load. The orbiting mass oscillator automatically changes its phase angle, and therefore its power factor, with these changes in the resistive impedance of the load.

A further important characteristic which tends to make the orbiting mass oscillator hang on to the load and continue the development of effective power, is that it also accommodates for changes in the reactive impedance of the acoustic environment while the work process continues. For example, if the load tends to add either inductance or capacitance to the sonic system, then the orbiting mass oscillator will accommodate accordingly. Very often this is accommodated by an automatic shift in frequency of operation of the orbiting mass oscillator by virtue of an automatic feedback of torque to the energy source which drives the orbiting mass oscillator. In other words, if the reactive impedance of the load changes this automatically causes a shift in the resonant response of the resonant circuit portion of the complete sonic system. This in turn causes a shift in the frequency of the orbiting mass oscillator for a given torque load provided by the power source which drives the orbiting mass oscillator.

All of the above mentioned characteristics of the orbiting mass oscillator are provided to a unique degree by this oscillator in combination with the resonant circuit. As explained elsewhere in this discussion the kinds of acoustic environment presented to the sonic source by this invention are uniquely accommodated by the combination of the orbiting mass oscillator and the resonant system. As will be noted, this invention involves the application of sonic power which brings forth some special problems unique to this invention, which problems are primarily a matter of delivering effective sonic energy to the particular work process involved in this invention. The work process, as explained elsewhere herein, presents a special combination of resistive and reactive impedances. These circuit values must be properly met in order that the invention be practiced effectively.

Briefly, the herein invention relates to a novel means for driving a stem or post into the ground. The invention is particularly useful where the stem is short in length or of a nonelastic material so that standing waves of suitable frequency cannot be generated therein in accord with my previously described invention. Thus, confronted with the problem of not being able to generate a resonant wave in the post or stem element itself, the herein invention overcomes the difficulty. This is accomplished through the use of an elastic element which can be, for example, a pneumatic spring, hydraulic spring, or even a long beam. This element serves to provide the essential elastic compliance required to generate the resonant frequency in the most preferred region of cyclic vibration. It also provides means for adjusting the frequency as will be explained in the detailed description. The vibration generator, which preferably is a mass orbiting oscillator, is considered one of the mass elements of the total system that vibrates according to the action of the resonator. Additionally comprising the mass of the system, as individual elements, are the source for driving the resonator, part of the support structure for the system and the structure comprising the elastic compliance member. The stem itself is also viewed as a mass element in this over-all vibratory system. One of the features of the invention relates to dividing the individual mass elements into two groups which move in opposed phase to one another about a given point or axis. Attempt is made to counterbalance the two groups of mass elements into two groups of approximately equal mass. Thus in viewing the system, it can be seen that the vibration generator utilizes the elastically compliant means as the main source for generating a resonant frequency. The system is constructed so that upon vibration due to the action of the generator, one group of elements moves in one direction while the other group of elements moves in the opposite direction, in opposed phased vibration relative to each other. In so doing, the elements counterbalance each other and provide for a nodal region of minimum vibration about the axes or points upon which they are balanced. It is at these points or axes that attachment of the device to additional machinery can be made because there will be no or very little transmission or loss of vibratory energy to the surrounding structure, insuring maximum transfer through the stem.

Several illustrative embodiments of the invention will now be described, reference for this purpose being had to the accompanying drawings, in which:

FIG. 6 shows a position following that of FIG. 5, the anchor post having driven to full depth;

FIG. 7 shows a position following that of FIG. 6, the drive tube of the anchor post assembly being retracted to free the anchor rod from the anchor plate;

FIG. 8 shows a series of successive views of the anchor post assembly during swinging from the driven position to the final anchorage position;

FIG. 9 shows a buried anchor and anchor rod, the drive sleeve being removed therefrom;

FIG. 10 is a view similar to a portion of FIG. 3, with the anchor and anchor rod in driving position, and with parts broken away to show underlying parts in section;

FIG. 11 is a cross-sectional view of an alternative form of anchor, being taken on line 11—11 of FIG. 12;

FIG. 12 is a side elevational view of an alternative of anchor;

FIG. 13 is a detailed view of the anchor and lower end portion of the anchor drive tube, being taken in accordance with the arrows 13—13 on FIG. 10;

FIG. 14 is a section taken on line 14—14 of FIG. 10;

FIG. 15 is a section taken on the broken line 15—15 of FIG. 16;

FIG. 16 is a section taken on line 16—16 of FIG. 15, being a vertical medial section through the air spring, oscillator, and associated components;

FIG. 16a is an enlarged portion of FIG. 16;

FIG. 17 is a section taken on line 17—17 of FIG. 16;

FIG. 18 is a plan section of a further embodiment of the invention, being taken on the broken line 18—18 of FIG. 19;

FIG. 19 is a view taken on accordance with the broken line 19—19 of FIG. 18;

FIG. 24 is a side elevational view of a further embodiment of the invention;

FIG. 25 is an enlarged elevational view of a portion of FIG. 24;

FIG. 26 is a transverse section taken on line 26—26 of FIG. 24;

FIG. 27 is a transverse section taken on line 27—27 of FIG. 24;

FIG. 28 is a plan view of the apparatus of FIG. 24;

FIG. 29 is a side elevational view of the apparatus of FIGS. 24–28, showing the same hung from a truck-mounted derrick;

FIG. 30 is a diagram illustrating successive positions in the driving of the anchor with the machine of FIGS. 24–29;

Figure 1:
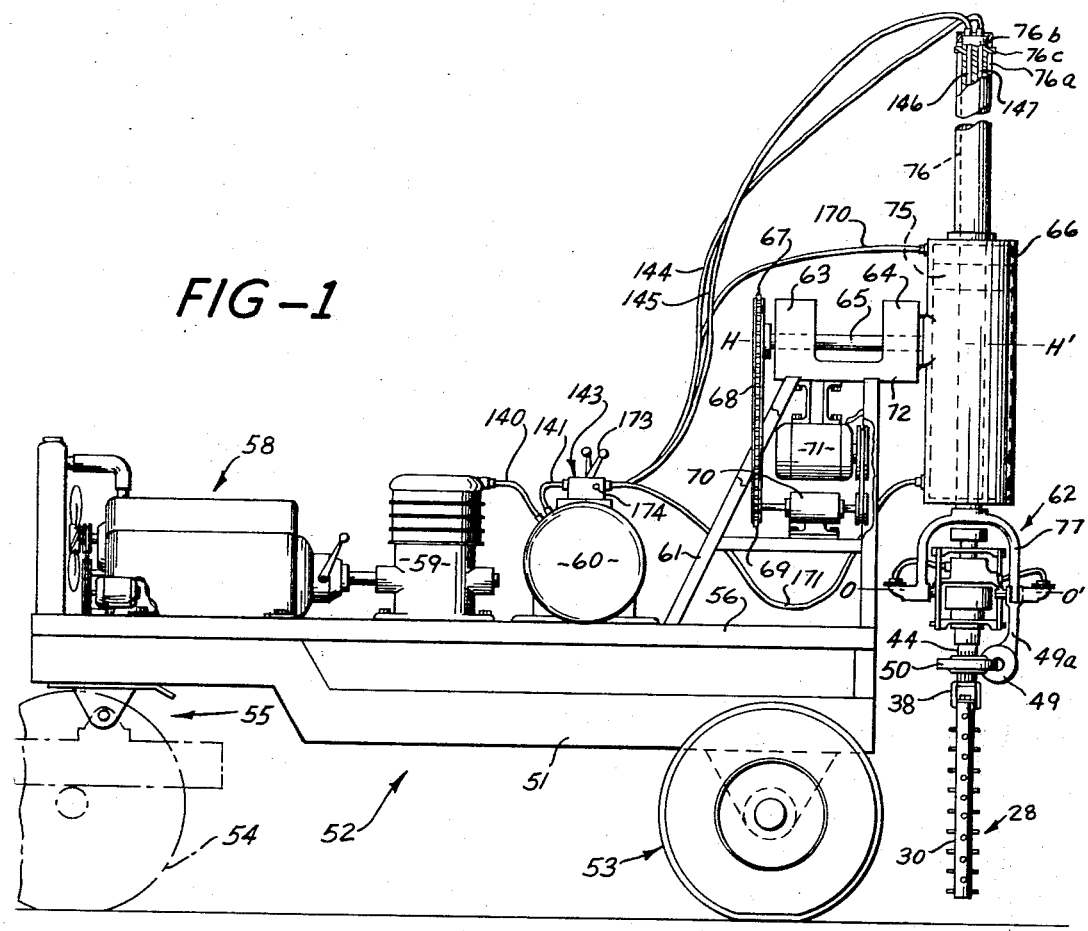
FIG. 1 is a side elevational view of apparatus in accordance with one embodiment of the invention.

Reference is first directed to the form of the invention shown in FIGS. 1–10 and 13–17, inclusive. While the anchor member may be, broadly considered, embodied in any one of many physical forms, the anchor shown in these figures comprises an anchor post 28 including a rod or shaft 30 (see FIGS. 10 and 13), typically of about seven feet in length, with an eye 31 formed at its lower end, and an anchor plate 33 pivoted on the lower end of rod 30 by means of eye 31. This eye 31 encircles and is pivotally mounted on a transverse pivot pin 32 fixed to the anchor plate 33. The anchor plate 33 may be typically a rectangular steel plate, approximately one foot square. It has a vertical notch 34 extending downwardly into it medially from its upper edge, serving to accommodate the lower end portion of the anchor rod 30, its eye 31 and a portion of the cross-pin 32 which extends transversely thereacross. During the driving of the anchor, the post thereof includes also a later removed sleeve 35, provided preferably with projecting pins or studs 35a, and which sleeve surrounds the rod 30 and is notched upwardly from its lower end on opposite sides, as indicated at 36 in FIG. 13, so as to engage over the upper edge portion of the anchor plate 33, on opposite sides of anchor slot 34. With the sleeve 35 thus in place, the anchor plate 33 is secured with its plane in alignment with the longitudinal axis of the rod 30 and sleeve 35. The upper extremity of anchor rod 30 is threaded to receive a nut 36a which is set down against a plate or disk 37 which engages the upper extremity of the tube 35.

A yoke 38 (see FIGS. 10 and 14) having yoke arms 39 depending from a head 40, has its said arms 39 secured to the upper extremity of anchor sleeve 35, and also to the disk 37, and the head 40 of this yoke has a threaded bore 41 into which is fastened the lower extremity 42 of a rotatable and vertically vibratory shaft 44. This shaft 44 which is vertically vibrated by means later to be described, has longitudinally extending spline ways 45, which are engaged by splines 46 formed inside the hub of a worm gear 47 (FIG. 16). Worm gear 47 is driven by worm 48 on the shaft on an electric motor 49, and a gear case 50 extending from the housing of motor 49 mounts and supports the worm wheel and worm assembly. Motor 49 is carried by an arm 49a which is supported independently of the vibratory shaft 44 as will be described hereinafter. From the description given thus far, it will be clear that the electric motor 49 can be operated, under certain circumstances, to act through the worm and worm gear and the splined connection with shaft 44 to impart a slow rotation to the latter. This does not occur during driving. The shaft 44 is vertically vibrated by means later to be described, this vibration, relative to the motor 49, worm 48 and worm wheel 47, being accommodated by the splined connection at 45, 46. Such vibration of shaft 44 is of course imparted through yoke 38 to the anchor post consisting of the sleeve 35 and rod 30 and to the anchor plate 33. When motor 49 is operated, the shaft 44, yoke 38, and anchor sleeve also rotate, the anchor rod 30 and plate then being disconnected, as later described.

Figure 2:
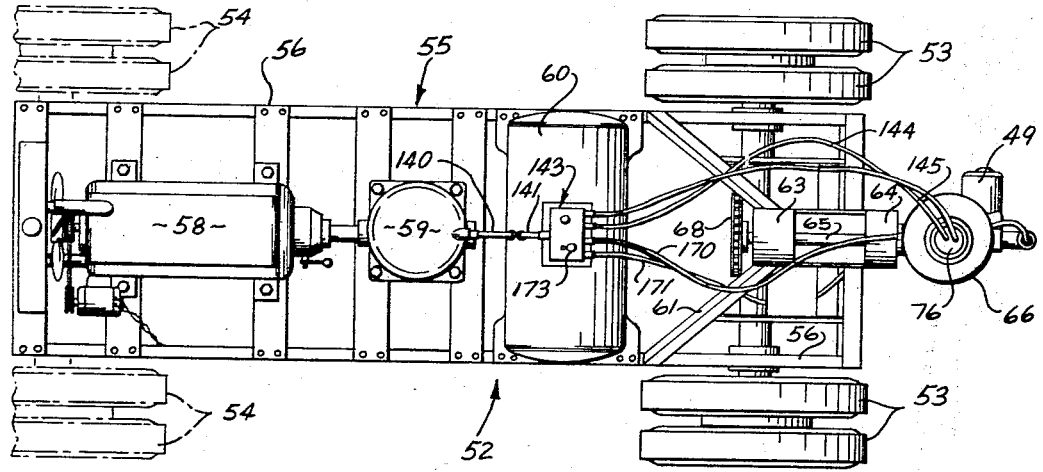
FIG. 2 is a plan view of the apparatus of FIG. 1.
Figure 3:
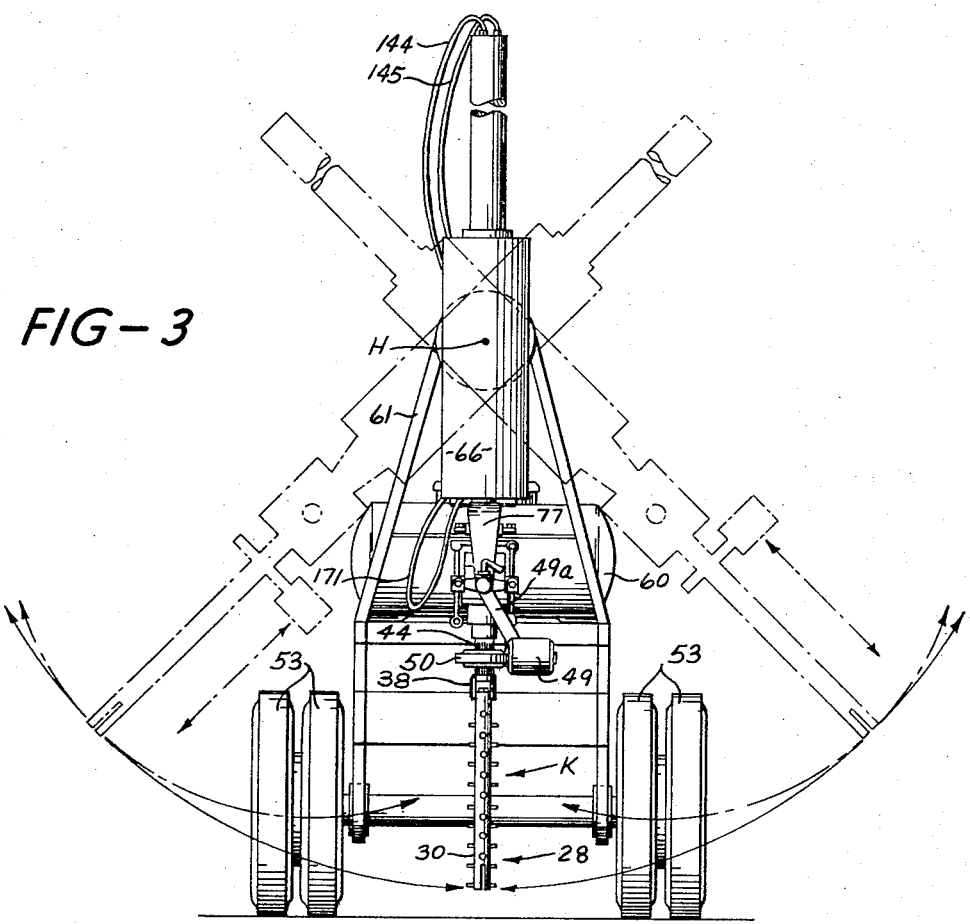
FIG. 3 is an end elevational view, looking at the apparatus from the right-hand side as seen in FIG. 2.
Figure 4:
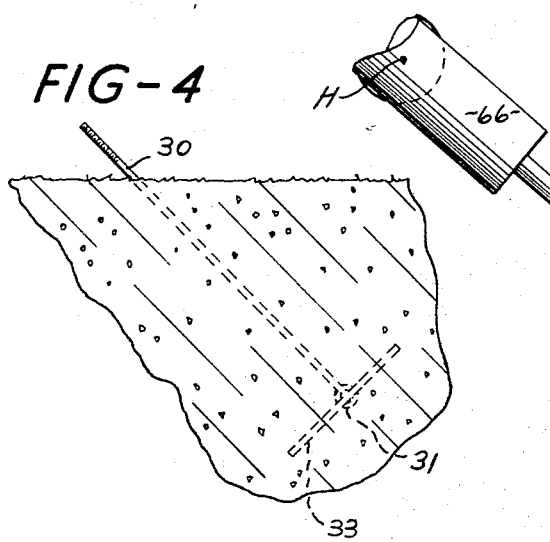
FIG. 4 shows a planted anchor and anchor rod in accordance with the invention.

Referring now to FIGS. 1–3, the equipment is shown mounted on the frame 51 of a wheel truck or trailer 52. The vehicle 52 is shown, somewhat diagrammatically, with rear wheels 53, while at 54 are indicated the rear wheels of a tractor vehicle, the conventional "fifth wheel" being designated somewhat conventionally at 55. The tractor vehicle is otherwise not shown. These features constitute no part of the invention and need not be illustrated or described in detail. Suffice it to say that a portable truck is provided, having a suitable frame such as that indicated at 51. Mounted on the frame 51 is a horizontal bed frame 56 for the apparatus of the invention. On this frame 56 are internal combustion engine 58, an air compressor 59 driven by engine 58, an air tank 60, and an upwardly extending framework 61 rising from frame 56 at the rearward end of the truck. The framework 61 supports at its upper end the anchor driving mechanism, designated generally by the numeral 62.

Framework 61 supports a pair of bearings 63 and 64 which journal a horizontal shaft 65. An air cylinder 66 is affixed to the rearwardly extending extremity of shaft 65, in a position just to the rear of the truck frame, and the forward extremity of shaft 65 carries a sprocket 67 connected by chain 68 to a small drive sprocket 69 driven through a suitable reduction gear set 70 from an electric drive motor 71 mounted on the underside of a bearing platform 72 secured at the top of framework 61. By this means, the air cylinder 66 may be slowly swung about the horizontal axis H—H of the shaft 65. Air cylinder 66 contains a piston 75 on a piston rod 76, which protrudes through suitable packing means in each end of the cylinder. To hold the rod 76 against rotation on its longitudinal axis, as will later be seen to be necessary, it may be surrounded above the cylinder 66 by a sleeve 76a mounted atop the cylinder and provided with longitudinal slots 76b receiving pins 76c projecting from the sides of rod 76. The lower end of the rod 76 carries a yoke 77 which pivotally supports the vibration generator and elastic spring assembly, generally designated by the reference numeral 78, as well as the vibrating shaft 44, yoke 38, and motor and gear case support arm 49a, on a horizontal pivot axis O–O' (see FIG. 1). The oscillator and spring assembly are shown best in FIGS. 10, 15, 16, 16a and 17, to which reference is now particularly directed.

The vibration generator and spring assembly consist essentially, in this embodiment of the invention, of an air-driven sonic vibration generator or oscillator 80 at the top, designed for delivery of an alternating force oriented longitudinally of the driving axis A–A' of the system (see FIG. 16), and an air spring unit 81 which elastically opposes this alternating force output from the generator unit.

Air spring 81 comprises a cylinder or cylindrical housing 82 containing a piston 83, and the latter is on a vertical column 84 which extends upwardly above the top of cylinder 82, through a tubular upward extension 85 from the top wall of the cylinder, and mounts the aforementioned vibration generator 80 at its top. This column 84 also extends downwardly from the piston through or into a tubular downward extension 86 on the bottom wall of the cylinder. Column 84 is suitably packed within said tubular members 85 and 86, as indicated in FIG. 16. Air under pressure is fed to and confined in the chambers 87 and 88 in cylinder 82, above and below the piston 83, respectively. Hence, if piston 83 is moved relatively upwardly in the cylinder 82, the air in chamber 87 is compressed and offers opposition to this movement. Similarly, if piston 83 is moved relatively downwardly within the cylinder 82, the air in chamber 88 is further compressed and offers opposition to such downward movement of the piston.

A thrust bearing housing assembly 90 is screwed into the lower extremity of tubular cylinder extension 86, and contains thrust bearings 91 for the reduced and screw-threaded upper extremity 92 of shaft 44. A washer 93 on the upper end of shaft extremity 92 held in position by nut member 94, supports the shaft 44 from thrust bearings 91. The shaft 44 and the anchor post assembly therebelow are thus mounted and swivelled on the lower end of the air spring housing, as indicated generally at S.

A head 96 (FIG. 16) has a vertical bore 97 which slidably receives and is packed to the upper end portion of the cylindrical column 84, above tubular cylinder extension member 85, and has an enlarged counterbore 98 extending upwardly from the bottom which slidably receives and is packed to the member 85. A working clearance 99 accommodating vertical oscillation of cylinder member 85 is provided between the upper end of said member 85 and the inner end of the counterbore 98, as shown. The head 96 is mounted directly on the yoke 77 by means of oppositely extending bracket arms 100 which have downturned extremities engaged by a pair of pivot pins 101 located on the pivot axis O–O' and screwed into bosses 102 on the inner sides of the lower end portions of the arms 77a and 77b of the yoke 77. The suspension arm 49a for the motor 49 is pivoted to one of the yoke arms on the axis O–O', having an upper end 104 pivotally mounted on the corresponding inside yoke boss 102. The yoke arms also have tubular outside bosses 106 on axis O–O', and a clamp plate 107 fastened to arm 49a and surrounding the corresponding boss 106 completes the mounting of the arm 49a. Head 96, the column 84, the air cylinder 82 on the column 84, and the parts below, including the shaft 44, and the anchor post 28 suspended from the latter, are all thus pivoted on the yoke for bodily swinging movement as a unit, about the axis O–O'.

In the operation of the apparatus, air cylinder 82 together with shaft 44 and the anchor, on the one hand, and the column 84 and parts fast therewith, on the other, oscillate on axis A–A' (FIG. 16) in opposite phase, air cylinder 82 moving down during upward movement of piston 83 and column 84, and vice versa. In order to accomplish precise opposed phasing of the cylinder and piston, and also to provide a stationary or substantially nonvibratory suspension point for the vibratory system, the following provisions are preferably but optionally made. A yoke 108 is mounted at its center on the upper end of piston column 84, and another yoke 109 is fixed at its center on the downward tubular extension 86 of the air cylinder 82. Yoke 108 has two oppositely extending arms 108a and 108b, and yoke 109 has two oppositely extending arms 109a and 109b, with the axes of the arms of the two yokes approximately forty-five degrees apart, as shown best in FIG. 15. Corresponding arms of the yokes 108 and 109 are positioned to opposite sides of the bracket arms 100, as will be clearly evident from the drawings (see particularly FIG. 15). A pair of levers 110 are provided, pivotally mounted at their centers on the arms 77a and 77b, respectively, of yoke 77 underneath the corresponding bracket arm 100, as by means of the pivot pins 101. These pivot pins 101 are aligned with the aforementioned pivot axis O–O', as earlier mentioned. The two arms 108a and 108b are pivotally linked to the corresponding ends of their respective levers 110 by links 112 and 113, respectively, and the two arms 109a and 109b of the yoke 109 are similarly pivotally linked to the remaining ends of the respective levers 110 by links 114 and 115, respectively. With this arrangement, as should be clear, the head 96 together with its bracket arms 100 stand stationary relative to the suspending yoke 77, while the column 84, on which the oscillator 80 and yoke 108 are mounted, and the cylinder 82, to which the yoke 109 is mounted, oscillate vertically in opposite phase, i.e., the column 84 moves downward while the cylinder 82 moves upward, and vice versa. These relative movements are utilized to control the air pressures in cylinder chambers 87 and 88, as will be further described hereinafter. It should be made clear that the links 112 to 115 and the levers 110 are optional, though preferred. The system will operate automatically in the manner described even if these parts are omitted, and they are useful primarily to assure stability. They also serve to support the vibrating system in the framework associated with the air cylinder 66, thus fulfilling an additional function which, if the links were not used, could be accomplished in other ways, e.g. by simple springs.

Directly mounted to and atop the column 84 is the heretofore mentioned sonic vibration generator 80. This generator 80 is a device for delivering a vertically oriented alternating force to the top end of the column 84, at a selected resonant frequency of operation of the vibratory system. Various forms of such vibration generators are available, but that here shown in of the orbital mass type referred to hereinabove, and is not only simple and effective, but has certain subtle features and advantages described hereinabove. It is therefore chosen for illustrative purposes, though without essential limitation. In the embodiment of this generator 80, as shown, a body 120 has a downwardly extending stem 121 which is screwed firmly into a screw-threaded socket formed in the upper end of the column 84. Stem 121 will also be seen to be inserted through a hole 122 in the center of the yoke 108, and to be shouldered so as to engage the top of yoke 108 and secure the latter tightly to the uper end of the column 84. Body 120 also has two oppositely extending horizontal sleeve portions 124, and these sleeve portions 124 define a bore 125 which extends transversely entirely through the body 120. Plugs 126 are screwed into the outer end portions of the bore 125, and include outer end heads 127 of a diameter greater than the outside diameter of the sleeve portions 124. Surrounding the sleeve portions 124 between the upper extremity of body 120 and the heads 127 are inertia rings 130, of somewhat greater inside diameter than the outside diameter of the sleeve portions 124, and these inertia rings 130 are designed to spin, whirl or gyrate on the sleeve portions 124. They are set into this spinning, whirling or gyrating action by air under pressure ejected from tangentially disposed orifices or jets 131 formed in the sleeve portions 124 at points under said rings 130 (see FIG. 17). The heads 127 and flattened faces 132 on the sides of the body 120 serve as lateral guides which closely confine the spinning rings 130, sufficient clearance being provided to permit free spinning, without frictional binding, but with minimized lateral play. Air under pressure is delivered to the sleeve bore 125 by means later to be described, and is ejected with tangential components of direction toward the inertia rings 130 via the tangential jets or orifices 131, driving the rings so as to spin or whirl on the sleeves 124, in the direction of the arrow, as indicated in FIG. 17. It will be evident that the inertia rings exert gyratory forces on the sleeve or sleeve portions 124, with resulting rotating force vectors turning about the axis of the sleeve portions 124, and being applied through said sleeve portions to the body 120 and thence to the upper extremity of the column 84. Under these circumstances, the rings automatically tend toward synchronization with one another, so that the force vectors are synchronized and therefore additive in their effect on the body 120 and the column 84.

It will be seen that the gyratory force so applied to the column 84 has both horizontal and vertical components. The horizontal component is of no use in the invention and can be ignored. It could be balanced out by use of two generator units having rotors turning in opposite directions. However, such balancing out is not essential, as will presently appear. The vertical component amounts to a vertically oriented alternating force, and the gyratory inertia rings 130 are driven, by regulation of the pressure of the air jetted thereagainst, such that the frequency of the alternating force corresponds to the resonant frequency of the vertically vibratory system driven thereby and comprised essentially of the anchor, the drive shaft 44, the air spring cylinder 82, the yoke 109, the yoke 108, the interconnecting links and levers, the oscillator 80, the column 84, the air spring piston 83, and the bodies of air in the air spring chambers 87 and 88.

The system for delivering air under pressure to the air-driven vibration generator 80, and also to the air spring 81, will next be described.

Referring to FIGS. 1 and 2, air compressor 59 is connected to pressure air reservoir 60 by pipe 140, and a pressure air supply pipe 141 leads from reservoir 60 to a multiple valve assembly 143. Leading fom this multiple valve assembly 143 are two pressure air supply lines 144 and 145, and these are coupled into the top end of piston rod 76, so as to communicate with two passageways 146 and 147 leading parallel to one another through the length of the rod 76. These passageways 146 and 147 communicate at the lower end of rod 76 with the upper ends of two passageways 148 and 149, respectively, extending down through the yoke arms 77a and 77b. The opposite ends of these passageways 148 and 149 communicate, on the axis O–O', with fittings 150 locked into the lower end portions of the yoke arms, specifically, as here shown, into the bosses 106. A hose 151 leads from one of these fittings 150 to a fitting 152 screwed into head 96 and into communication with an annular internal groove 153 formed therein around the column 84. A transverse bore 154 extending through column 84 communicates with the groove 153, and communicates also with a passage 155 leading upwardly through the upper portion of column 84 and through stem 121 to the bore 125 feeding the tangential air discharge jets 131.

The other fitting 150 has connected thereto a hose 160 leading to a fitting 161 communicating with an annular groove 162 formed in head 96 around the cylindrical cylinder extension 85. With piston 83 centered in cylinder 82, the annular groove 162 is in full register with two diametrically opposite ports 163 in the cylindrical extension 85 of cylinder 82. These two ports 163 narrow inwardly to form two narrow slots 164 and 165 which open inside said cylindrical member 85. When the column 84 and piston 83 are in their mid position in cylinder 82, as they are in FIG. 16, slot 164 registers with a port 166 in column 84 leading to a passage 167 that opens into the chamber 87 inside cylinder 82 above piston 83. Correspondingly, in this position of the parts, the slot 165 registers with a port 168 in column 84 leading to a passageway 169 that opens to the space 88 in cylinder 82 below piston 83. When piston 83 moves in either direction from its mid position, the ports 166 and 168 are closed, so that the air in chambers 87 and 88 is then cut off from outside communication, and the pressure air is thus confined in the cylinder above and below the piston 83. Consequently, when piston 83 moves upward, the pressure in chamber 87 increases above the mean value of the pressure supplied from the reservoir 60, and correspondingly, the pressure in chamber 88 falls below this mean value. The resistance to upward motion of the piston therefore increases rapidly and the system behaves like a spring being compressed. Similarly, when piston 83 moves downwardly from its mean position, the ports 166 and 168 are again closed, and the pressure in chamber 87 then decreases while the pressure in chamber 88 increases. Hence, on both the upward and downward stroke of the piston, the piston experiences a force like a spring being compressed. Thus the piston is double acting in the sense that it experiences a progressively increasing opposition whenever it moves to either side of its mean position.

Further considering the spring action of the arrangement, and in terms of the acoustic art, the piston experiences yielding opposition in the nature of elastic stiffness when moved in either direction against the two bodies of air confined, at pressure, above and below it. This stiffness is determined by two factors. First, the air pressure supplied from the pressure air reservoir 60 tends to compress the air in both chambers 87 and 88 equally and so makes the air quite dense. The change in pressure above or below the piston due to a given displacement of the piston will be greater, the greater the air density. Hence raising the pressure of the air supplied to both sides of the piston increases the stiffness of the system. Similarly, reducing the clearance volume of the chamber spaces 87 and 88 also increases the stiffness of the system. In addition, piston area influences the stiffness of the system, the larger the area of the piston the greater being the stiffness. Consequently, by adjusting piston diameter, air pressure from the reservoir, and the clearance volume on each side of the piston, I may make the system as stiff as desired. The resonant frequency of a vibratory system is a function of the stiffness of the system and the mass of the system. With such an air spring as I have described, it is possible to design a resonant system which is as stiff as one wishes to make it. Low mass combined with great stiffness (low compliance) raises the resonant frequency, and the resonant frequency may thereby easily be raised very high. It is contemplated that for anchor driving operations the resonant frequency would typically be of the order of sixty cycles per second to 120 cycles per second.

Excepting for leakage, the air spring does not consume air from the pressure reservoir 60. It is simply necessary to pump up the air pressure in chambers 87 and 88 until the system resonates at the desired frequency, and the pressure is then maintained at that level. Conventional piston rings on the piston 83 seal the piston against leakage. Similar rings are used at other sliding points, as indicated in the drawings and as will be understood without further discussion.

It has been mentioned that the yoke 77 which suspends the oscillator or vibration generator, the air spring, the shaft 44, anchor post, etc., is on the lower end of a piston rod 76, which protrudes through air cylinder 66, and has thereon a piston 75 (FIG. 1). The piston rod 76, and parts thus suspended therefrom, are moved between an uppermost position as indicated in FIG. 1, and a lower or extended position, by air under pressure from reservoir 60, such pressure air being conveyed to or from the upper and lower ends of air cylinder 66 by two air hoses 170 and 171 leading from any suitable four-way valve mechanism within the control valve assembly 143 to the upper and lower ends, respectively, of cylinder 66. It will be understood how by a simple manipulation of a control handle 173 of said four-way valve within assembly 143, pressure air is delivered to the upper end of cylinder via hose 170, and returned from the lower end in the cylinder via hose 171, such return air being exhausted to atmosphere through a suitable port such as indicated at 174 at one end of valve assembly 143. It will further be understood that by a return manipulation of the valve control handle 173, air under pressure is delivered via hose 171 to the lower end of the cylinder 66, and returned from the upper end of the cylinder 66 to the valve assembly 143 to be exhausted at 174. Thus, under manual control, the piston rod 76 may be moved between the uppermost position shown in FIG. 1 and a downwardly extended position such as represented in other figures.

The operation of the system will now be described: As mentioned earlier, it is desired to vibrate the system at a resonant frequency, determined by the mass and elastic constants of the system, so that powerful vertical vibrations are imparted to the anchor post 28 including the anchor plate 33.

It is a feature of the invention that the anchor post, including the anchor plate 33, are a part of the system which undergoes resonant frequency vibration, and these component parts thus vibrate in an environment of resonance. These component parts are essentially elements of mass in a resonant vibratory system, though in some cases they may undergo cyclic elastic deformation, and thus contribute elastic compliance, and therefore elastic compliance reactance, to the vibratory system, thus influencing the properties of the resonant vibratory system, such as the frequency for peak resonance. The principal elastic compliance factor or parameter, however, derives from the aforementioned air spring unit 81, operating as earlier described. The mass reactance of the system is of course made up of all vibratory parts having mass, including the anchor components, as mentioned earlier. Also as mentioned earlier, the elastic stiffness of the air spring can be made quite high, and can be set at a value such that a desirable resonant operating frequency can be attained for apparatus of the scale indicated, such as in the region of from 60 to 120 cycles per second, for example. It will further be understood that the system as now described in detail is characterized by so-called "lumped" parameters of mass and elastic stiffness (or compliance), rather than being of the distributed constant type such as characterizes my pile driving systems referred to in the introductory portion of this specification.

Considered in more detail, the vibratory action of the system is as follows: Vibration generator 80 is operated at the frequency at which resonant vibration is attained, and this resonant operation is achieved by gradually raising the pressure of the air fed to the generator 80 until the characteristics of resonant vibration are manifest. These manifestations of course consist primarily of maximized vibration amplitude of all vibratory parts of the system. It has of course been described how the speed of the vibration generator, i.e., its frequency, can be regulated simply by controlling the pressure of the air delivered from the control valve in valve assembly 143 that regulates the pressure to the flow line leading to the generator. When the generator is in operation, it delivers, as earlier described, both vertical and horizontal components of alternating force to the top end of the column 84 that carries the air spring piston 83. The vibration being at resonance only for the component of vertical vibration, the horizontal component produces no material or disturbing transverse vibration, and can be ignored. The vertically oriented alternating output force from the generator 80 is applied, however, to the column 84 in a direction to vibrate or oscillate the piston 83 in the cylinder 82. This same vertically oriented alternating force is also applied through the yoke 108, the links 112 and 113, the levers 110, the links 114 and 115, and the yoke 109 to cause vertical oscillation of the air spring cylinder 82 equally and oppositely to the vertical oscillation of the air spring piston 83. In other words, the cylinder 82 and the piston 83 therein oscillate in opposite phase.

The oscillation of the air spring cylinder 82, and, of course, of the yoke 109, is imparted through the swivel connection S to the shaft 44, and thence through the yoke 38 to the sleeve 35, the anchor rod 30, and the anchor plate 33. These last named parts will be seen to vibrate more or less bodily, in unison with one another. The possibility of some longitudinal cyclic deformation vibration in the tube or sleeve 35 and the rod 30, with some degree of wave pattern therealong, is not excluded; but primarily these parts will in usual cases tend to vibrate in a bodily manner.

Some characteristic features of the vibratory system should now be considered. There are two mass systems, vibrating in opposite phase, and thus tending to counterbalance one another. These are connected, and their motion controlled, by an elastic spring element, in this case the air in the air spring. One of these mass systems is comprised primarily of the anchor and anchor post assembly, the shaft 44, the air spring cylinder 82, the yoke 109, and the links 114 and 115. The other is comprised primarily of the column 84 and air spring piston 83, the vibration generator 80, and the links 112 and 113. These two mass systems substantially counterbalance one another, so as to cancel, or minimize or materially reduce, the net vibratory influence of the vibratory system on the mounting yoke at the axis O–O'. Acoustically, there are two counterbalancing vibrating mass or mass-reactance groups, one including the anchor and/or post and the other the source of alternating force, coupled in an acoustic circuit which includes a compliance element (the air spring), and operating at a resonant frequency of the system, with the feature that no force is consumed or wasted in vibrating the masses, and maximum driving effort is accordingly available at the anchor or post to be driven.

Figure 5:
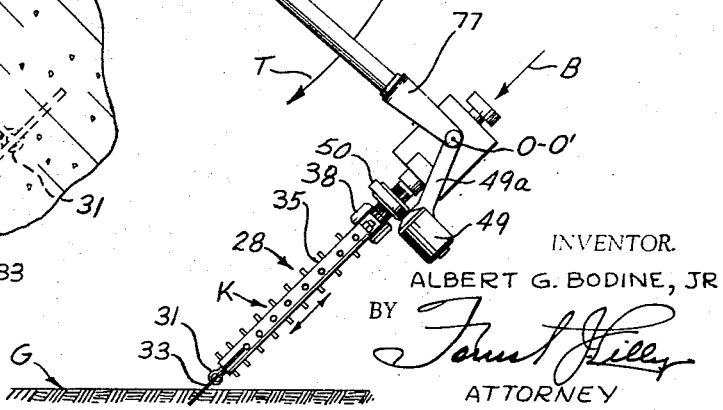
FIG. 5 is a view similar to a portion of FIG. 3, showing the anchor post assembly in an initial position just prior to driving.
Figure 20:
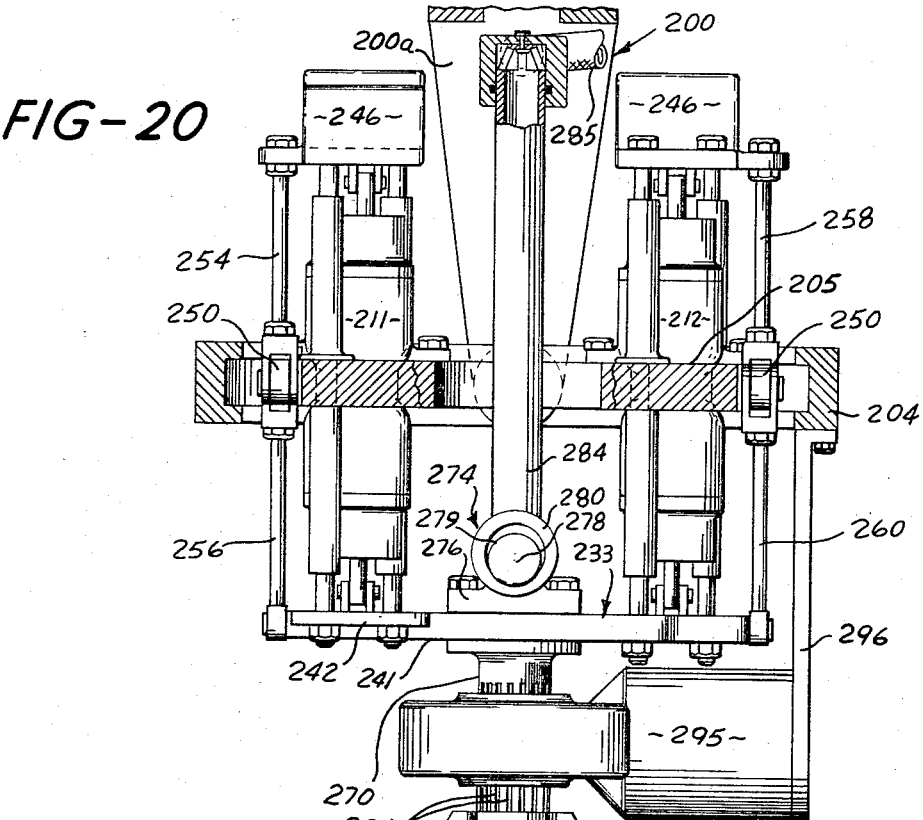
FIG. 20 is a section taken on broken line 20—20 of FIG. 18.
Figure 21:
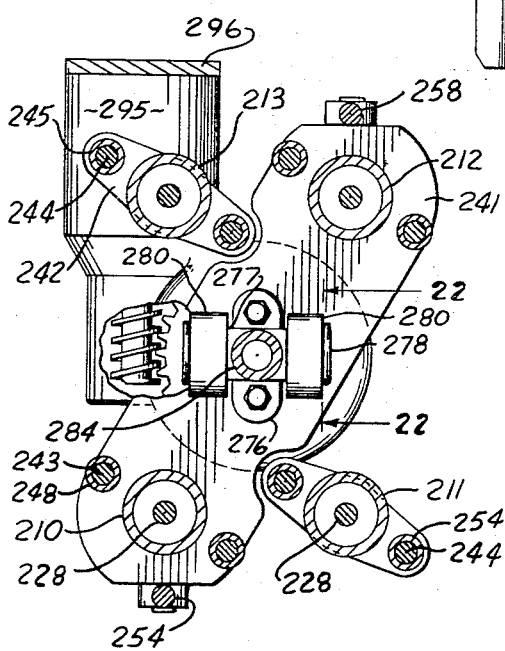
FIG. 21 is a section taken on line 21—21 of FIG. 19.
Figure 22:
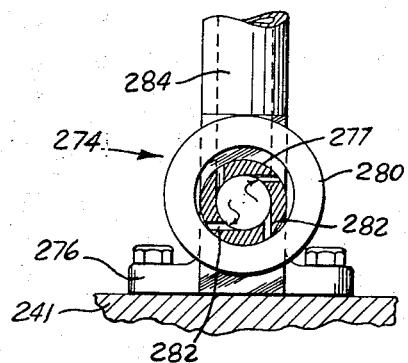
FIG. 22 is a section taken on line 22—22 of FIG. 21.

To plant an anchor and anchor post, the following procedure is carried out. By means of motor 71 (FIG. 1), shaft 65 and the air cylinder 66 thereon are slowly rotated from the normal position shown in full lines in FIGS. 1, 2, and 3 to an angular position for the cylinder 66, such as the angular position shown in phantom lines to the right in FIG. 3, and also as represented in FIG. 5. The anchor rod 30 and anchor plate 33 are assembled with the sleeve 35 and yoke 38 in the manner clearly illustrated in FIG. 10, and, as illustrated in FIG. 5, the anchor post and other parts trunnioned on yoke 77 on axis O–O' are swung relatively to piston rod 76 so as to make an angle with the latter of close to ninety degrees, the lower edge of the anchor plate 33 engaging ground surface G and, if the ground is soft, possibly the lower edge portion of the anchor plate 33 burying itself in the upper surface portion of the earth, more or less as represented in FIG. 5. The point of engagement of the anchor plate 33 with the earth is so adjusted relatively to the horizontal swing axis H of the air cylinder that when the anchor plate and rod 30, together with the surrounding sleeve 35, have been driven angularly down into the ground, as to the position of FIG. 6, the pivot connection between the anchor rod 30 and the anchor plate 33 will lie directly under the horizontal cylinder swing axis H (see also FIG. 8). As will of course be clear, the piston rod 76 is substantially fully extended in the preliminary position of FIG. 5, with piston 75 positioned at the lower end of air cylinder 66. The parts being in the position of FIG. 5, vibration generator 80 is driven as heretofore described, and causes the vibration also heretofore described, the speed of the vibration generator being adjusted to resonance, all as made clear in the foregoing. Longitudinal vibration of a largely bodily type is thus imparted to the anchor post assembly, including the anchor rod 30, the anchor plate 33, and the drive tube or sleeve 35. This longitudinal vibratory action of these parts causes the anchor plate 33 and the drive sleeve 35 to become buried in the earth under the cooperative influences of the vibration of these parts, in a resonant sonic vibration environment, and a longitudinal or axial biasing force represented by the arrow B in FIG. 5. This biasing force results from the masses of the vibratory system, plus certain mass loading resulting from the weight of the piston rod 76, air cylinder 66, and yoke 77, which are pivotally mounted at H and supported by the vibrational system at the yoke axis O–O'. This biasing force can be further increased by driving the motor 71 to apply clockwise torque to the cylinder 66 and rod 76 as viewed in FIGS. 5 and 8, which will be seen to comprise additional biasing means, and may also be regarded as means for applying a controlled bias. Under the circumstances, the anchor and rod work themselves longitudinally down into the soil, as from the position of FIG. 5 to the positions of FIG. 6. The movement into the ground results from soil fluidization and mobility resulting from the vibratory action of the anchor and post assembly under the conditions of resonant sonic vibration set up in the system.

It is pointed out that the yoke 77 is trunnioned to the vibrational system at a nonvibratory point of the latter, namely, on the pivot axis of the levers 110, where no vibration takes place. The yoke 77, piston rod 76, and air cylinder 66 are thus isolated from the vibration in the system.

When the anchor post assembly has been thus driven to the position of FIG. 6, the nut 36a on the upper end of anchor rod 30 (FIG. 10) is removed, and the sleeve 35, the yoke 38 thereabove, and the remainder of the system backed off a few inches, as to the position indicated in FIG. 7, so as to clear the lower end of the sleeve 35 from the upper edge of the anchor plate 33.

The next operation is to dig a lateral trench t by means of studded drive sleeve 35 which will enable anchor rod 30 to be rotated about pivot pin 32 through a total angle of substantially ninety degrees, as represented in FIG. 8. Thus, at the right in FIG. 8, the drive tube 35 is in a position corresponding to FIG. 7, and this tube is then swung from said position through the intermediate vertically oriented position shown in the figure to the position shown in full lines at the left. In order to accommodate this rotation of the drive tube through the earth, the drive tube is simultaneously vibrated and rotated on its axis. The vibration, and the digging actions of the studs on the rotating drive tube 35 result in the digging of the necessary trench, the loosened soil not being removed, but moving around the side of the drive tube as the latter swings over. The vibration is produced as before, with the difference that the anchor plate 33 and anchor rod 30 are now disconnected. The rotation of the drive tube 35 is accomplished by means of electric motor 49 which, through the gears shown in FIGS. 10 and 16, has a splined driving connection with the vibratory shaft 44 that carries the yoke 38 at the upper end of the drive tube. While this combined rotation and longitudinal vibration of the drive tube 35 is taking place, motor 71 slowly rotates or swings the air cylinder 66 and piston rod 76 in a clockwise direction as viewed in FIGS. 3 and 8. In carrying out this action, the piston 75 in the air cylinder 66 and the rod 76 are retracted and then again extended, as required, as the drive tube swings from the initial position at the right in FIG. 8, through the intermediate vertical position to the extreme angular position at the left. This is accomplished by proper manipulation of the valve controlling air flow to the two ends of the air cylinder, as will be readily apparent.

The drive tube and anchor having thus been placed in the position shown in full lines in FIG. 8, the drive tube 35 is then axially removed by further clockwise rotation of the air cylinder and the piston rod 76, as represented in FIG. 9. Anchor rod 30 is now normal to anchor plate 33. The soil cut to make the trench t is never removed from the trench but remains there in a loosened condition; hence, in the entire operation of setting the anchor and moving the rod 30 to its final position, no soil is removed at all. It is simply loosened in a very limited place. The anchor plate 33 is located in substantially undisturbed earth and therefore attains maximum holding power.

With a slight alteration, the anchor rod 30 can remain connected to the yoke 38 and be vibrated thereby during motion from the right-hand to the left-hand positions of FIG. 8. The rod 30 is simply extended upwardly until it makes engagement with the head of the yoke 38, or the end of the shaft extremity threaded in the latter; and the lower end portion of the drive sleeve 35, such as the portion below the break in FIG. 10, is also omitted. The anchor rod is then vibrated by the yoke, being forced in the downward direction by the yoke engagement with its upper end, and in the upward direction by the nut 36a.

FIGS. 11 and 12 show a modification of the system just described, using a screw-type anchor, either vertically, or at an angle, but which is left in position after driving. No lateral trench cutting operation is involved with this anchor. There is shown in FIG. 12 a vibrating and rotatable shaft 44a, corresponding to the shaft 44 of the earlier embodiment, and this shaft 44a is driven through splines, gears, and a motor 49a, as indicated, all as in the earlier embodiment, it being understood that the balance of the system may be exactly as in the earlier described embodiment. The lower end of shaft 44a carries yoke 38a, generally like yoke 38, and fixed to this yoke is a drive tube member 180, which has at its lower end clutch jaws 181 adapted to engage mating clutch jaws 182 at the top end of a second or lower drive tube 184. The clutch jaws are held normally in engagement with one another by means of a rod 186 mounted by means of plate 187 in the upper end portion of tube 184, and secured at the top by means of nut 188 screwed thereon above plate 189 which is fixed to the yoke 38a. With the parts as shown in FIG. 12, the lower drive tube 184 is drivable through the clutch jaws from the upper drive tube member 180 and the rotating and vertically vibratory shaft 44a. After installation, removal of nut 188 permits retraction of yoke 38a and the upper drive tube 180, leaving the lower drive tube 184 in position in the ground.

Drive tube 184 is provided with a spiral anchor 190 which is in the form of a screw and, as here shown, makes one complete turn up around the drive tube 184. In driving the anchor, the vibration generator and air spring system vibrates the anchor tube assembly 184 along the longitudinal axis thereof, and simultaneously therewith, the anchor is rotated by means of the motor 49a. It is desirable to screw the anchor into the ground without material disturbance of the soil and for this reason the rate of rotation of the anchor screw must rather closely match the rate of penetration owing to the combined vertical vibration and rotating action. This can be accomplished so that the spiral anchor or screw screws into the ground without large disturbance of the ground excepting where it must be displaced to make way for the spiral screw or blade 190. The spiral anchor is thus buried in the soil without more than very local disturbance of the ground, so that the anchor is afforded good holding strength.

Once the anchor has been thus installed in the ground, the nut 188 is removed and the driving members, inclusive of the drive tube part 180, are retracted, leaving the anchor in the ground, with the anchor rod member 186 protruding therefrom.

Reference is next directed to FIGS. 18–23, inclusive, showing another embodiment of the invention. These drawings show only the portion of the equipment which differs from that of the first described embodiment, and it will be understood that the truck as shown in FIGS.

1–3, for example, as well as the anchor assembly and the method of driving and finally positioning the latter may be as in the earlier embodiments. The improvements of FIGS. 18–23 are comprised primarily of a new type of hydraulic spring arrangement in the vibratory system, to be substituted for the air spring of the earlier embodiment. The present embodiment also avoids the necessity of the swivel connection between the spring assembly and vibration generator, on the one hand, and the rotatable and vibratory anchor driving shaft 44 on the other.

Figure 23:
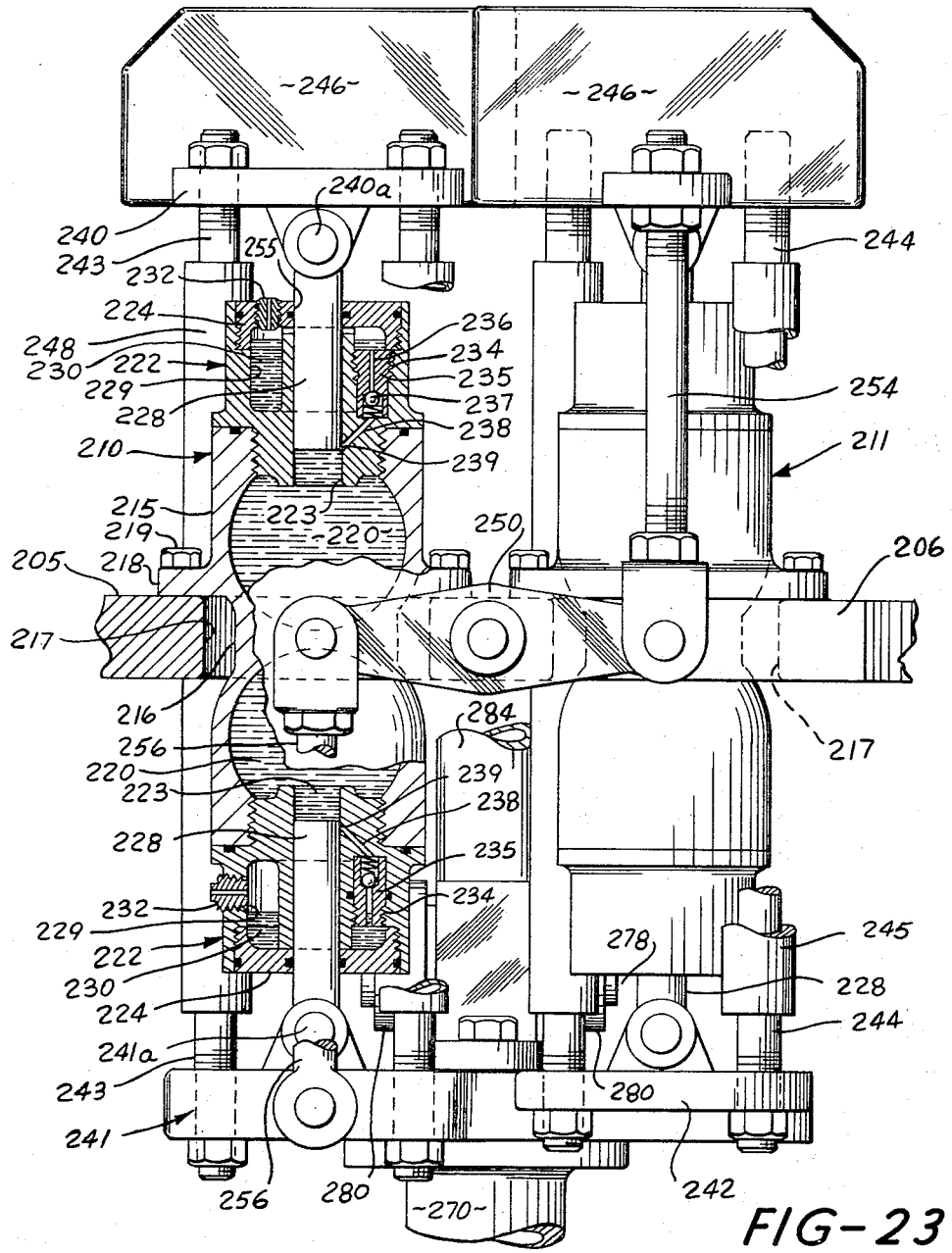
FIG. 23 is a section taken on line 23—23 of FIG. 18.

A yoke is again provided, designated in this instance by numeral 200 (FIG. 19), and is on the end of a piston rod 76', corresponding generally to the piston rod 76 of the first described embodiment, it being understood that said rod 76' carries a piston within an air cylinder, in an arrangement previously considered. The yoke 200 has two arms 200a and 200b. Received between the lower end portions of these yoke arms, and pivoted thereto by means of pivots or trunnions 201 and 202, is an internally channeled ring 204, in whose channel is rotatably received the arcuate edge portions of a mounting plate 205. This plate 205 is circular in outline, excepting at two opposite edge portions 206 where it is cut back on parallel chordal planes to accommodate certain later described equipment, as appear clearly in FIG. 18. The plate 205 forms a nonvibratory mounting for the hydraulic spring and mass elements of the resonant vibratory system now to be described. Four double-ended hydraulic spring units 210, 211, 212, and 213 are provided. These units are vertically elongated, and mounted substantially at their midpoints on the mounting plate 205. One of these units, 210, is best shown in FIG. 23. All of these units are identical to one another, and a description of the unit 210 will suffice. The unit comprises first a main central casting 215, generally vertically elongated, and generally cylindrical in form, with a reduced mid-section at 216 for convenient reception in a notch 217 extending laterally into mounting plate 205 from the flat edge 206. Casting 215 has just above plate 205 a mounting flange 218 by which it is fastened to plate 205 through use of fastening screws 219. Casting 215 contains two generally spherical chambers 220, one over the other, and spaced apart, as shown, so as not to be in communication. Into the upper and lower ends of the casting 215 are screwed cylinder units 222, and these have vertical cylindrical bores 223 opening into the chambers 220. End caps 224 are screwed into the outer ends of the cylinder units 222, and are bored, as at 225, in continuation of the cylindrical bores 223. Plungers 228 are slidingly fitted in the cylindrical bores 223 and in the bores 225 in cap 224, being packed in the latter as indicated. Each cylinder unit 222 contains a well 229 for containing hydraulic fluid 230, as illustrated, and this well 229 may be filled through an opening normally closed by a filler plug 232. Communicating with well 229 inside cylinder unit 222 is a threaded bore 234 which receives a check valve unit 235, the latter containing a fluid passage 236 in communication with the fluid 230 in well 229. Said passage 236 is controlled by a ball check valve 237, and fluid passing said check valve is conveyed by passage 238 to cylinder bore 223, the discharge orifice 239 of said passage 238 being located where it is alternately covered and then uncovered by the plunger 228 as the latter is vibrated. Normally, the discharge orifice 239 is covered by the plunger 228, as clearly appears in FIG. 23. The spherical cavity 220 and the cylinder bore 223 is completely filled with oil or other hydraulic fluid up to plunger 228. Consequently, when plunger 228 is moved downwardly, the oil in cavity or chamber 220 is compressed. Oil is approximately ten percent compressible when the hydraulic pressure reaches 20,000 pounds/square inch. The change in volume of oil when compressed by a plunger as shown is directly proportional to the travel of the piston, as is also the change in pressure. The oil therefore acts like a very stiff spring and offers a resistance which is directly proportional to the displacement of the piston, in essence, following Hooke's Law.

It will be evident that a single plunger, cylinder and chamber unit is only single-acting in the sense that one might increase resistance when the piston is pushed inwardly, but a similar force can not be obtained when the piston or plunger is pulled out beyond the point at which the pressure in chamber 220 becomes atmospheric. If the plunger is withdrawn further, the oil simply cavitates, and this must be avoided. For this reason, two units are used back to back, in the double-ended arrangement shown in FIG. 23. To this end, the upper end of upper plunger 228 is pivotally connected at 240a to a cross-head 240, while the lower end of lower plunger 228 is pivotally connected at 241a to one end of a yoke 241 (FIGS. 18 and 23). The cross-head 240 and said one end portion of the yoke 241 are interconnected by tie rods 243, which are guided for vertical movement by guide tubes 248 mounted on mounting plate 205. The two plungers 228 are thus constrained to move up and down together. With this arrangement, when the upper plunger 228 is compressing fluid in upper chamber 220, lower plunger 228 is reducing the pressure in the corresponding lower chamber 220, and vice versa. The system is thus double-acting, in that it requires a force to move the plunger assembly either upwards or downwards from the mean position illustrated in FIG. 23.

The plunger 228, and the like plungers of the other units, are fitted in their respective cylinder bores with a clearance of about forty-millionths of an inch. This prevents oil from leaking past the plunger into the reservoir or well 229. A small leakage is however impossible to avoid and the oil which does leak past the plunger from cavity 220 finds its ways into the reservoir 229. In order to return this oil to the chamber 220, the check valve 237 is provided. When plunger 228 is sufficiently withdrawn from the cavity 220, orifice 239 is uncovered, and at this time, if the pressure in cavity 220 falls below atmospheric pressure, oil from well or reservoir 229 flows through passage 236, past check valve 237, through passage 238 and orifice 239 and into chamber 220. Leakage oil is thus automatically returned to the system when the system pressure falls below atmospheric pressure at the end of each outward stroke on the plunger.

As earlier stated, one pair of hydraulic plunger and cylinder units arranged back to back as shown, and with their pistons interconnected by the tie rods 243, constitute one hydraulic double-acting spring unit. There are, in all, four such double-acting spring units, 210, 211, 212, and 213, as heretofore mentioned. In order that the reaction forces from the individual double-acting units be active along the central longitudinal axis of the anchor assembly, each such unit is matched with a similar unit diametrically across the central axis. Thus, unit 210 is matched with unit 212, and to this end, the aforementioned yoke 241 extends diametrically across the central axis of the system and is common to the units 210 and 212. Thus, the plunger units 228, both above and below, in the two matched units 210 and 212, all move up and down in unison. Another such matched pair are the units 211 and 213 (FIG. 18). Giving further attention to the last mentioned units 211 and 213, the lower plunger members 228 thereof are in each case connected to a lower cross-head 242. The cross-head 242 of each of units 211 and 213 is connected by tie rods 244, guided by guide tubes 245, to upper weighted cross-head 246, the reason for the large mass or weight of the latter being explained presently.

It is desired, for a reason to appear presently, that the plungers 228 of the hydraulic units 211 and 213 move up and down in opposite phase from the plungers 228 of the hydraulic units 210 and 212. That is to say, and for a reason to appear presently, it is desired that the two weighted cross-heads 246 move up and down in unison, in phase opposition to the up and down movement of the yoke 241. To mechanically interconnect the parts for this action, levers 250 may be pivotally mounted at their center points on the two opposite edges 206 of the mounting plate 205, the pivotal mountings for these levers being located, in the one case, between the hydraulic units 210 and 211, and in the other, between the two hydraulic units 212 and 213. Weighted cross-head 246 is connected by link 254 to one end of the corresponding lever 250, and the corresponding end of the yoke 241 of unit 210 is connected by link 256 to the opposite end of said lever. Correspondingly, the weighted cross-head 246 of the unit 213 is connected by a link 258 to one end of the corresponding pivoted lever 250, and to the other end of said lever 250 is pivotally connected a link 260 which is connected at its lower end to the other or corresponding end of the cross-head 246. By this means, the plungers of the hydraulic units 211 and 213 are mechanically constrained to move always in phase opposition to the plungers of the hydraulic units 210 and 212.

The weighting of the cross-heads 246 is such as to substantially counterbalance the anchor assembly. In other words, the added mass of the two cross-heads 246 is substantially equal to the mass of the vibratory anchor assembly, comprised of the vibratory shaft 270 and the anchor post and anchor elements below the latter. As will be clear, particularly from FIG. 19, the vibratory shaft 270 is mounted directly to the underside of the yoke 241. It may now be seen that, with the arrangement described, the yoke 241, together with the shaft 270 and anchor elements below, move always equally and oppositely to the weighted cross-heads 246. The reactions at mounting plate 205 are thereby substantially balanced. so that plate 205 has substantially no vibratory action. It is, acoustically speaking, at the node of a resonant vibratory system, and has zero or minimized vibration amplitude.

The vibration generator is designated generally at 274 (see particularly FIG. 19), and is of the same type illustratively shown in the earlier described embodiment. A body 276 is fastened down to yoke 241, and includes two oppositely extending horizontally disposed tube or sleeve members 277. These are closed at opposite ends by plugs 278 having at their outer ends flanges 279 which laterally confine inertia rings 280 adapted to spin or whirl about the sleeves. These are driven by air under pressure ejected through tangentially oriented orifices or air jets 282 formed in the sleeve members. The operation of this generator is the same as that earlier described and need not be repeated. Suffice it to say that the generator delivers to the yoke 241, and therefore to the upper end of shaft 270 and the anchor elements therebelow, a vertically oriented component of alternating force. Air for driving the rings 280 is supplied via a tube 284, to the upper end of which is swivel-connected an air supply hose 285, and the latter is connected by fitting 286 to an air passage 289 in pivot pin 201, said passage 289 communicating with a duct 290 in yoke arm 200a, fed in turn by air supplied through a bore or passage 291 extending longitudinally through plunger rod 76'. As in the earlier embodiment of the invention, air is supplied under pressure through the communicating passages described and the pressure thereof regulated until the vibration generator 274 resonates the system, resonance again being manifested by readily evident maximized vibration amplitude.

The shaft 270 extends down to yoke 292, supporting an anchoring assembly 293 which may be of the same type as that of the first described embodiment of the invention, and which is not further illustrated. This shaft 270 has splines 294 and is driven from intermeshing splines of a worm wheel driven from a worm on the shaft of a motor 295, in the manner illustrated in FIG. 16. The motor 295 is carried by an arm 296 depending from frame ring 204.

The general operation of the system of FIGS. 18–23 is similar to that of the system of FIGS. 1–10 and 13–17, and need not be further described, beyond to note that the rotatable mounting of the hydraulic spring assembly and vibration generator afforded by the frame plate 205 rotatably fitted in the frame ring 204 avoids the necessity of the swivel S (FIG. 16) of the first described embodiment. Instead, the frame plate 205, and all parts thereon, simple turn in the stationary frame ring 204. Also, the above described link means by which the plungers of the hydraulic units 211 and 213 are mechanically constrained to vibrate always in phase opposition to the plungers of the hydraulic units 210 and 212 may be omitted, since the inherent tendency of the system is to vibrate in this fashion irrespective of the interconnecting links.

Reference is next directed to FIGS. 24–31, inclusive, showing a third embodiment of the invention, wherein the pneumatic and hydraulic springs of the earlier embodiments are replaced by a horizontally disposed elastic beam which is manitained in resonant lateral standing wave vibration. The standing wave vibration takes place in a plane which includes the longitudinal axis of the anchor, and the anchor has an operative driving connection or coupling to the beam at a velocity antinode region of the standing wave. Such a region occurs at the mid-point of the beam, and the preferred arrangement involves a coupling between the mid-point of the beam and the upper end of the anchor post structure.

In FIG. 29, the rearward end portion of a carrying truck is designated generally at 300, and is shown to have mounted thereon a simple derrick structure 301. This derrick structure 301 includes a pair of horizontally spaced overhanging arms 302 and 303 from which the postdriving machine of the invention is suspended. The arms 302 and 303 are connected near their extremities by a horizontal rod 304. A pulley 306 (FIGS. 24 and 29) is suspended from a point near the extremity of the derrick arm 303, and over this pulley is trained a suspension cable 307 going to a winch W mounted on truck 300. The suspension cable 307 is connected as at 308 to the upper longitudinal bar 309 of a suspension frame 310, the point of connection being made towards one end of the bar 309.

Connected to the other end of the bar 309, as at 311, is a suspension cable 312 which is trained over a pulley 313 suspended from derrick arm 303, thence guided over a pulley 315 hung from derrick rod 304, and finally going onto winch W, all as clearly shown in FIGS. 24, 28, and 29. The suspension frame 310 includes two end members 316 and 317 turned downwardly from the ends of bar 309 and pivotally connected at 318 in mountings 319 mounted on a main frame generally designated by numeral 320. The pivotal mountings 319 are on a horizontal axis Y—Y which passes through the center of gravity of the subsequently described anchor driving apparatus hung from the frame 310, so that said apparatus may be swung readily about said axis Y—Y.

On one end of the main frame 320 is mounted an internal combustion engine 322, and on the other end portion thereof is a gear box 323, and a stack of counterbalance weights 324 which serve to counterbalance the engine 322. These components all forms parts of the anchor driving apparatus.

As will appear, the main frame 320, and parts mounted thereon, including certain components still to be described, are supported through suspension frame or hanger 310 from the two cables 307 and 312, and it will be further understood that the winch W operating on these cables permits the machine to be raised or lowered.

Main frame 320 includes two spaced channel irons 340 running longitudinally thereof, and a pair of shorter channel irons 341 mounted on top of the channels 340 at one end of the latter, and also a pair of shorter channel irons 342 mounted at the other end of the channels 340 on the tops thereof. Engine 322 will be seen to be mounted on the two channel members 341, and the gear box 323 and the weights 324 to be mounted on the channel members 342.

In the space between channel members 340 is a steel, horizontally disposed I-beam 350. At each of two points approximately 17% of the length of the I-beam 350 from its ends, said beam is furnished with a mounting to the two channel members 340 of main frame 320. With particular reference to FIG. 27, the web of the I-beam 350 has mounted therein a transverse pin or tube 346. This pin 346 is mounted in bushings 347 which extend through the opposite side members of mounting member 319 and also through the main frame channel irons 340. Two points of the I-beam 350, spaced inwardly from the ends thereof as mentioned, are thus mounted to the main frame 320. As will be explained more fully hereinafter, the beam 350 undergoes lateral resonant standing wave vibration, preferably in a one-wavelength mode, and nodes of the pattern of this standing wave normally occur substantially 17% of the length of the beam inwardly from each of its extremities, so that the beam 350 is thus mounted onto the main frame at the nodal points of its pattern of standing wave vibration. Vibratory action at these nodal points is of course minimized, so that the main frame is largely isolated from the large standing wave vibration taking place in the I-beam.

A vibration generator 360 (see FIG. 26) is mounted onto the I-beam 350, in this preferred example, at the mid-point of said beam. The base part 361 of the housing of this generator 360 furnishes the upper side of a rectangular frame 362 which surrounds I-beam 350. As clearly seen in FIG. 26, the sides of this frame 362 comprise channel members 363, and the frame is completed by a plate 364 at the bottom. A transverse pin 365 passing through the web of the I-beam 350 is fixed to the two side members of the frame 362, and thus, the vibratory output from the vibration generator 360, which comprises a vertically oriented alternating force, is applied through the frame 362 to the mid-point of the I-beam 350.

The vibration generator 360 is of a simple type, comprising two spur gears 366 in mesh with one another and provided with suitable bearing inside the housing of the generator 360. These two spur gears 366 carry eccentric weights 367, and thus comprise, in effect unbalanced flywheels. The weights 367 are positioned on the gears so as to approach and recede from one another in unison, and so also as to move vertically in unison. Accordingly, horizontal vibratory forces developed by the unbalanced weights 367 are equal and opposed and cancel one another, while vertical components of force generated by these unbalanced weights are equal, in phase with one another, and thus additive. These vertical components comprise the vertically oriented alternating force generated in the generator 360, and which will be understood to be applied from the housing of the generator directly to the frame 362 and thence through pin 365 to the I-beam 350.

One of the gears 366 is on a long shaft 370 extending into gear box 323. The gear box 323 contains step-up gears, and has an input shaft 372 driven from the drive shaft 374 of internal combustion engine 322. In the present example, shaft 372 is somewhat angularly disposed, and is accordingly furnished with universal joints 375 at its two ends.

Secured to the bottom plate 364 of frame 362, in vertical alignment with the mid-point of I-beam 350, is a thrust bearing housing 377 in which is journalled and vertically supported a vertical shaft 378, to the lower end of which is tightly mounted a spur gear 380. The spur gear 380 is in mesh with a spur gear 381 on a vertical shaft 382 journalled in a frame 383, and this frame 383 includes portions secured to the frame channels 340, as well as a worm gear housing 385 that houses a worm wheel 386 on the upper extremity of shaft 382, and a worm gear 387 on a shaft 388 carrying a pulley 389 connected by belt 390 to a drive pulley 391 on engine drive shaft 374. A clutch 392 permits selective drive of pulley 391 and thus rotation of the gear 380. Accordingly, when the engine 322 is in operation, slow rotation may be imparted to the gear 380 by way of the transmission described immediately above. The spur gear 380 will clearly vibrate in a vertical direction with the standing wave vibration of the mid-portion of the beam 350, but this vibration does not interfere with the meshing of the gears 381 and 380, the gear 381 continuing to drive the gear 380 even though the latter is in substantial vertical vibration while the former is vertically substantially stationary.

Secured to the lower side of the spur gear 380 is the flange 400 of a tubular member 401 which serves as the head for a yoke 402 similar to the yoke 38 of FIGS. 10 and 14. Thus, this yoke has two arms 403 which support an intermediate plate or disk 404, against which is positioned the upper extremity of a drive sleeve 405 corresponding to the sleeve 35 of the first described embodiment of the invention, and which, as in the case of sleeve 35, forms a part of the driven anchor post assembly during driving. This tube 405 thus is welded in place between the yoke arms 403, and surrounds an anchor rod 406 corresponding to the anchor rod 30 of the first embodiment. The anchor assembly may be exactly as shown and described in connection with the first embodiment of the invention, and further illustration or description should not be necessary at this point. In passing, however, it may further be pointed out that the anchor assembly in the case of FIGS. 24–31 does include a pivoted anchor plate 408 on the lower end of the rod 406, held in aligned position during driving by the tube 405, as represented in FIG. 29.

As mentioned hereinbefore, a lateral mode of standing wave vibration is set up in the elastic beam 350 by the alternating output force delivered from the vibration generator 360. Such a standing wave is diagrammed in FIG. 31, at $p$, just above a representation of the elastic beam 350, it being understood that the width dimension of the diagram $p$ represents the vibration amplitude at corresponding points along the beam 350. Velocity antinodes, which are regions of large vibration amplitude, occur at the two ends of the beam, as at V, and at the mid-point, as at V', while nodes N, which are regions of zero or minimized vibration amplitude, occur at point approximately 17% of the length of the beam inward from each of the beam extremities. A beam such as 350 can be driven in such a standing wave pattern by properly acoustically coupling a vibration generator to it at or close to any of its velocity antinodes, but there is advantage and it is a preferably used feature of the invention that the vibration generator 360 be acoustically coupled to the vibratory beam 350 at its middle velocity antinode V'. In this preferred configuration, the elastic beam thus does not have to transmit sonic energy along its wave pattern from the vibration generator to the post being driven. There is thus low loss factor or attenuation along the length of the wave pattern. One advantage following from this arrangement is that the acoustic nodes N are very pronounced, i.e., low vibration amplitude at the nodes, so that by mounting the beam at these nodes, the nonvibratory parts of the system are effectively isolated from the vibration in the beam.

Figure 31:
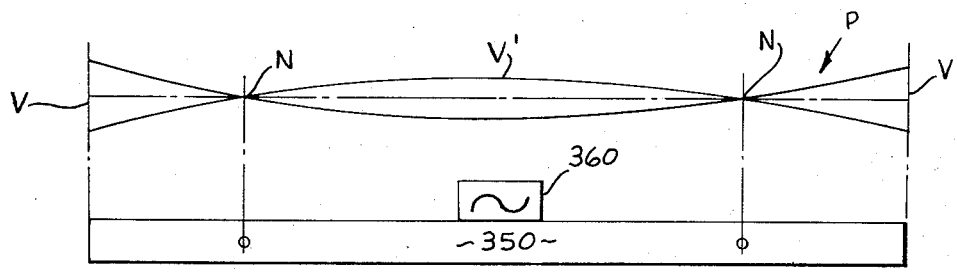
FIG. 31 shows a standing wave diagram representative of the vibratory action in the embodiment of FIGS. 24–29.

In operation, engine 322 is driven at a speed to operate the vibration generator 360 at a frequency corresponding to the frequency which resonates the beam 350 in the desired resonant standing wave pattern $p$, such as indicated in FIG. 31. Maximized vibration amplitude is thereby obtained for the beam 350, and for the anchor post assembly. The installation of the anchor follows substantially the steps and operations described in connection with the first embodiment of the invention. Preliminarily, the entire machine hung from the hanger frame 310 is tilted about the center-of-gravity pivot axis Y—Y so that the anchor post assembly makes a substantial angle with the vertical, such as, for example, forty-fixe degrees to sixty degrees. The entire machine, in this tilted condition, is then lowered on cables 307 and 312 until the anchor engages the ground. The machine is then operated in a manner now evident so as to cause longitudinal vibration of the anchor post assembly and the anchor, the machine being continuously lowered by the cables 307 and 312 as the anchor penetrates the ground. The substantial mass of the machine, inclusive of the engine balancing weights 324, frame 320, etc., is available for the necessary bias; and the cable suspension comprises a means for applying a controlled bias, it being evident that a slight lowering or slackening of the cables with the anchor in engagement with the soil increases the bias force effective on the anchor post assembly. Also, the truck 300 is moved slowly forward to follow the horizontal component of the diagonal motion of the anchor assembly. The anchor assembly is not rotated at this time. When the anchor has been driven to its full depth and is in a position corresponding to that of FIG. 6, the nut 407 (FIG. 25) on the anchor rod 406 is removed, as in the first embodiment, and the anchor drive tube or sleeve 405 is withdrawn slightly to disengage from the anchor plate 408. The anchor assembly is then in the position indicated at the right in FIG. 30. Then, with the anchor drive tube 405 being longitudinally vibrated by the vibratory motion of the beam 350, clutch 392 is engaged so that the anchor tube 405 also rotates. Then, while rotation and longitudinal vibration are taking place, the truck is driven slowly forward, while the machine is raised and lowered by cables 307 and 312 so as to move the anchor assembly through an arc, as indicated by the arrow 409 in FIG. 30. In this motion, the rotating studded drive tube 405 cuts its path through the soil as in the operation described in the first embodiment of the invention. Finally, the anchor drive tube 405 is withdrawn, leaving the anchor plate 408 and anchor rod 406 in place, in a position and situation such as represented in FIG. 9.

It will be appreciated that the apparatus of FIGS. 24–31 can also drive other types of anchors, such as the screw-type of FIGS. 11 and 12, and no limitation to any specific type of anchor is therefore to be implied. With the screw type, of course, the anchor post assembly can be driven down at an angle to vertical, or vertically, depending upon the tilt given to the machine on the axis Y—Y.

The system of FIGS. 24–31 analyzes acoustically, in certain respects, similarly to the two preceding examples. Here, instead of having two entirely separate mass groups vibrating in opposite phase, as in FIGS. 1–17, for example, with a neutral point of no vibration amplitude therebetween, such as at the axis O–O', I provide a "distributed-constant" elastically vibratory beam, i.e., with elements of mass and elasticity distributed along the length thereof. This beam vibrates in the described lateral standing wave pattern, and different portions of the beam vibrate in opposite phase, and tend to counterbalance one another. Also, the elastic stiffness property of the beam acts, in effect, between these different portions of the beam and controls the vibratory motion thereof. Thus, as will be understood from a consideration of the standing wave diagram of FIG. 31, the portions of the beam outside the nodes N move always in opposite phase to the portions of the beam between said nodes, and thus the masses thereof have a counterbalancing action in the plane of vibration. The counterbalancing is aided by the fact that the beam portions outside the nodes vibrate to greater amplitude and with greater velocity than does the beam portion between the nodes. Somewhat equivalently to the situation in the first described embodiment of the invention where the vibratory system has a neutral axis, or vertically stationary mounting point, at O–O', the nodes N are locations of zero (ideally) or minimized amplitude, and are therefore desirable vibration isolating mounting points. They are also ideal locations for imposition of bias mass loading.

Figure 32:
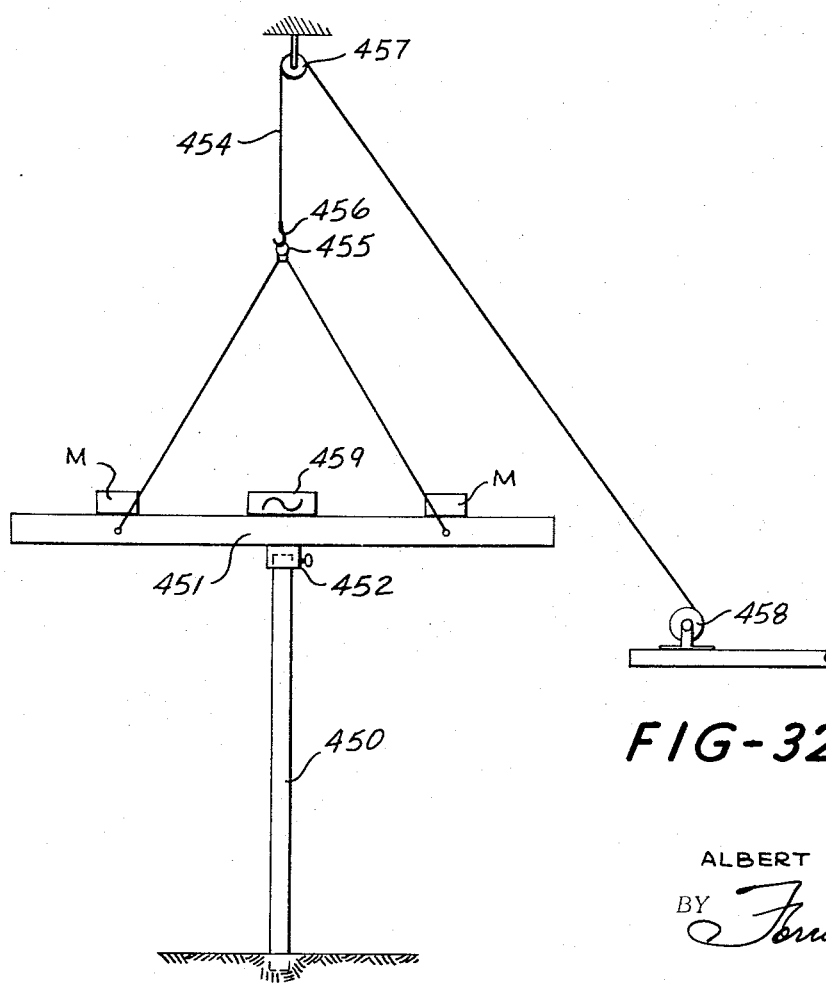
FIG. 32 is a diagrammatic view of a simplified version of the invention useful for driving rods, stakes, or other stem-like members into the earth.

FIG. 32 shows diagrammatically a simple system in accordance with the invention for driving a simple anchor rod, pipe, or other stem or stake or the like, substantially vertically into the ground, and utilizing an acoustic system of the type described in connection with FIGS. 24–31.

Here the "stem" to be driven comprises a pipe or tube 450, which, however, could be a solid member. The stem may be simply an iron rod or stake, or a fence post. This stem is coupled to the mid-point of a horizontal elastic beam 451, composed typically of steel, using any suitable coupling means 452. The beam is suspended by a simple cable sling 454, connected to the nodal points of the beam, considering that the beam will be set into a one-wavelength mode of standing wave vibration (as in FIG. 31). The center of the sling is formed with a loop 455, engaged by a hook 456 on the end of a cable trained over a suspension pulley 457 and thence going to a winch 458. On the center of the beam 451 is mounted oscillator or vibration generator 459, which is preferably one of the orbital mass types, or any other found suitable. The system is set into acoustic vibration the same as that of FIGS. 24–31, and thus vertically vibrates the stem 450 against the soil.

This oscillator 459 will be understood to involve, as do all such vibration generators, a frame or housing of certain mass; and this mass together with that of the beam 451 exerts a desirable downward bias on the stem 450 to be driven. If additional biasing force is required for any driving situation, added biasing masses M can be mounted on the beam preferably at the nodes, as shown. The cable suspension means is operable, by exerting controlled tension therein by means of the winch, to take some of the weight of the vibrating system, and thus reduce the biasing force against the soil. Or, by relaxing tension in the cable, the full mass bias available may be applied. The cable system accordingly becomes and functions as a means for applying a controlled bias.

The system of FIG. 31 is a simple and effective one for easy and rapid driving of simple stems, rods, posts, stakes, and the like.

By reversing the direction of rotation of the winch, the cable system of FIG. 31 may also be employed in tension, to apply a reverse or upward bias to the system. With the vibratory system operated under such a condition of upward bias, I may drive or pull a previously buried anchor, anchor stem or post upward and out of the ground. A little consideration will reveal that the same may be accomplished with all the other embodiments of the invention herein disclosed. In the case of FIGS. 1 et seq., for example, the piston 75 may be supplied with pressure fluid from below to secure an upward bias. In FIGS. 24–30, the cable system may be tensioned by the winch. Broadly, therefore, the invention is one for driving a post or stem longitudinally in the ground, and the direction of drive is determined by the direction of bias application.

The broad invention has now been described by way of several specific illustrative embodiments. It will be understood that these are for illustrative purposes only and that numerous changes in design, structure and arrangement may be made without departing from the spirit and scope of the appended claims.

I claim:

1. In a system for driving a stem in the earth, the combination of:
  a mechanical acoustically vibratory system characterized by elastically compliant and mass elements interconnected so as to establish a resonant frequency of vibration, said system including said stem as a predominantly lumped-mass longitudinally vibratory mass element thereof;
  a vibratory mass element intercoupled with said stem and arranged for opposed-phase vibration relative thereto;
  elastically compliant means connected between and acting upon said stem and said vibratory mass element; and
  a vibration generator acoustically coupled to a vibratory portion of said system and operable at said resonant frequency of vibration, said generator comprising a portion of one of said mass elements of said system.

2. The subject matter of claim 1, wherein said vibration generator is fixed to and vibrates with said stem.

3. The subject matter of claim 1, wherein the elastically compliant and mass elements of said system are of lumped constant character.

4. The subject matter of claim 1, wherein said elastically compliant element and at least two vibrating opposed-phase mass elements are combined in an extended elastically vibratory member of distributed constant character.

5. The subject matter of claim 1, wherein said elastically compliant means comprises a pneumatic spring.

6. The subject matter of claim 1, wherein said elastically compliant means comprises a hydraulic spring.

7. In a system for driving a stem in the earth, the combination of:
   a mechanical acoustically vibratory system characterized by elastically compliant and mass means interconnected so as to establish a resonant frequency of vibration, said system including said stem as a predominantly lumped-mass longitudinally vibratory mass means thereof, and an opposed-phase vibratory mass means intercoupled with said stem for opposed-phase vibration relative thereto;
   the intercoupling between said stem and said opposed-phase mass means comprising a vibrating means having points of different vibration amplitudes, including minimum vibration;
   supporting means for said vibratory system connected near said point of minimum vibration; and
   a vibration generator acoustically coupled to a vibratory portion of said system and operable at said resonant frequency of vibration;
   said generator constituting a mass component of said mass means of said vibratory system.

8. In a system for driving a stem in the earth, the combination of:
   a mechanical acoustically vibratory system characterized by elastically compliant and mass means establishing a resonant frequency of vibration, said system including said stem as a predominantly lumped-mass longitudinally vibratory mass means thereof, and an opposed-phase vibratory mass means intercoupled with said stem for opposed-phase vibration relative thereto;
   the intercoupling between said stem and said opposed-phase mass means comprising a vibrating means having points of different vibration amplitudes, including minimum vibration;
   means for applying a bias force to said vibratory system, in a direction longitudinally of said stem, and near said point of minimum vibration; and
   a vibration generator acoustically coupled to a vibratory portion of said system and operable at said resonant frequency of vibration;
   said generator constituting a mass component of said mass means of said vibratory system.

9. In a system for driving a stem in the earth, the combination of:
   an elastic beam disposed transversely of said stem and coupled at its center to an end of said stem, said beam being subject to resonant elastic standing wave vibration in a lateral mode in a plane including said stem, said standing wave including nodes and antinodes;
   a vibration generator coupled to said beam at an antinode thereof and operable at the resonant frequency of said standing wave; and
   means for applying a bias loading to said stem acting longitudinally thereof.

10. The subject matter of claim 9, wherein said bias loading comprises mass means loaded onto said beam at two nodes thereof on opposite sides of said stem.

11. In a system for driving a stem in the earth, the combination of:
    an elastic beam disposed transversely of said stem and coupled at its center to an end of said stem, said beam being subject to resonant elastic standing wave vibration in a lateral mode in a plane including said stem, said standing wave including nodes and antinodes;
    a vibration generator coupled to said beam at an antinode thereof and operable at the resonant frequency of said standing wave; and
    means for controllably applying bias loading to said stem in a direction longitudinally thereof.

12. In a system for driving a stem in the earth, the combination of:
    an elastic beam disposed transversely of said stem and coupled at its center to an end of said stem, said beam being subject to resonant elastic standing wave vibration in a lateral mode in a plane including said stem, said standing wave including nodes and antinodes; and
    a vibration generator coupled directly to the center of said beam.

13. In a vibratory driving system for a soil anchor, the combination of:
    an anchor embodying an anchor plate and an anchor rod pivotally connected thereto;
    means for supporting said anchor rod and anchor plate with an edge of said plate in engagement with the ground soil and said rod extending upwardly therefrom substantially in said common plane;
    means for longitudinally vibrating the anchor plate and rod and simultaneously exerting a downward bias force on the anchor plate and rod, whereby said anchor plate and rod are driven into the ground soil; and
    means for simultaneously vibrating said rod and pivotally moving said rod through the ground soil, about a pivot axis corresponding substantially to the pivotal connection between the anchor plate and rod, to a position angularly displaced from the plane of said anchor plate.

14. In a vibratory driving system for a soil anchor, the combination of:
    an anchor embodying an anchor plate and an anchor rod pivotally connected thereto;
    a drive sleeve surrounding said anchor rod and engageable at one end with anchor plate to releasably lock said anchor plate substantially in a common plane with said anchor rod and sleeve;
    means for supporting said anchor rod, sleeve and anchor plate with an edge of said plate in engagement with the ground soil and said rod and sleeve extending upwardly therefrom substantially in said common plane;
    means for longitudinally vibrating the anchor plate, rod and sleeve and simultaneously exerting a downward bias force on the anchor plate and sleeve, whereby said anchor plate, rod and sleeve are driven into the ground soil;
    said sleeve being thereafter releasable from said anchor plate; and
    means for simultaneously vibrating said sleeve and pivotally moving said sleeve and the anchor rod surrounded thereby, through the ground soil, about a pivot axis corresponding substantially to the pivotal connection between the anchor plate and rod, to a position angularly displaced from the plane of said anchor plate.

15. In a vibratory driving system for a soil anchor, the combination of:
    an anchor embodying an anchor plate and an anchor post means pivotally and releasably lockable thereto, whereby said post means may be selectively secured in a position coplanar with the anchor plate, or released for pivotal motion relative thereto;

means for supporting said anchor post means and anchor plate with an edge of said plate in engagement with the ground soil and said post means extending upwardly therefrom substantially in their common plane;

means for longitudinally vibrating the anchor plate and post means and simultaneously exerting a downward bias force on the anchor plate and post means, whereby said anchor plate and post means are driven into the ground soil;

said post means being therefore releasable from said anchor plate to free it for said pivotal motion relative thereto; and means for simultaneously vibrating the post means and pivotally moving it through the ground soil, about the axis of said pivotal connection between the anchor plate and post means, to a position angularly displaced from the plane of said anchor plate.

References Cited
UNITED STATES PATENTS

| | | | |
|---|---|---|---|
| 2,420,793 | 5/1947 | O'Connor | 175—55 X |
| 2,676,681 | 4/1954 | Phillips | 61—53.68 |
| 2,780,068 | 2/1957 | Grimes | 61—53.68 |
| 2,942,849 | 6/1960 | Bodine | 175—55 |
| 3,148,510 | 9/1964 | Sullivan | 61—53.68 |
| 3,283,833 | 11/1966 | Bodine | 175—56 |

CHARLES E. O'CONNELL, *Primary Examiner.*

R. E. FAVREAU, *Assistant Examiner.*